United States Patent
Matsuo

(10) Patent No.: US 8,262,837 B2
(45) Date of Patent: Sep. 11, 2012

(54) BONDING METHOD, BONDED STRUCTURE, LIQUID DROPLET DISCHARGING HEAD, AND LIQUID DROPLET DISCHARGING APPARATUS

(75) Inventor: Yasuhide Matsuo, Suwa (JP)

(73) Assignee: Seiko Epson Corporation (JP)

( * ) Notice: Subject to any disclaimer, the term of this patent is extended or adjusted under 35 U.S.C. 154(b) by 474 days.

(21) Appl. No.: 12/413,846

(22) Filed: Mar. 30, 2009

(65) Prior Publication Data
US 2009/0246537 A1    Oct. 1, 2009

(30) Foreign Application Priority Data
Apr. 1, 2008    (JP) .................................. 2008-095472

(51) Int. Cl.
*B29C 65/00* (2006.01)
(52) U.S. Cl. .................................................... 156/272.6
(58) Field of Classification Search ............... 156/272.2, 156/272.6
See application file for complete search history.

(56) References Cited

U.S. PATENT DOCUMENTS
2007/0238300 A1    10/2007    Ogihara et al.

FOREIGN PATENT DOCUMENTS

| JP | 01-207475 | | 8/1989 |
|---|---|---|---|
| JP | 05-82404 | | 4/1993 |
| JP | 07-066549 | | 3/1995 |
| JP | 08-332447 | | 12/1996 |
| JP | 2003297821 A | * | 10/2003 |
| JP | 2005-246707 | | 9/2005 |
| JP | 2007-302873 | | 11/2007 |
| JP | 2008-307873 | | 12/2008 |

* cited by examiner

*Primary Examiner* — Daniel McNally
(74) *Attorney, Agent, or Firm* — Harness, Dickey & Pierce, P.L.C.

(57) ABSTRACT

A bonding method includes a first process that includes plasmatizing a first gas including a raw gas containing a siloxane (Si—O) bond at a reduced-pressure atmosphere, substituting the first gas by a second gas mainly including an inert gas, and plasmatizing the second gas to form a first plasma polymerized film on at least a part of a base member so as to obtain a first bonded object including the base member and the plasma polymerized film and a second process that includes preparing a second bonded object that is to be bonded to the first bonded object and pressing the first and the second bonded objects against each other such that a surface of the first plasma polymerized film is closely contacted to a surface of the second bonded object to bond the objects together.

13 Claims, 8 Drawing Sheets

BONDING METHOD, BONDED STRUCTURE, LIQUID DROPLET DISCHARGING HEAD, AND LIQUID DROPLET DISCHARGING APPARATUS

The entire disclosure of Japanese Patent Application No. 2008-095472, filed Apr. 1, 2008 is expressly incorporated by reference herein.

BACKGROUND

1. Technical Field

The present invention relates to a bonding method, a bonded structure, a liquid droplet discharging head, and a liquid droplet discharging apparatus.

2. Related Art

Conventionally, two base members are bonded (adhesively bonded) together by an adhesive such as an epoxy, urethane, or silicon adhesive.

For example, a liquid droplet discharging head (an inkjet recording head) incorporated in inkjet printers is constructed by bonding together components made of different materials such as resin, metal, or silicon with an adhesive, In this case, a liquid or paste-adhesive is applied to a bonded surface of each component to bond the components to each other via the adhesive applied. Then, heat or light is applied to cure the adhesive, thereby achieving bonding between the components.

However, such an adhesive-based bonding has problems such as reductions in bonding strength and size precision, and a time-consuming bonding process because of its long curing time.

Additionally, in many cases, a primer is needed to increase bonding strength. Thus, cost and time for use of the primer leads to an increase in bonding cost and complication of the bonding process.

Meanwhile, as an alternative to the adhesive-based bonding method, there is a solid-to-solid bonding method.

In the method, without any intermediate layer such as an adhesive, components can be directly bonded to each other (See JP-A-1993-82404, for example).

The above bonding method, which uses no intermediate layer such as an adhesive, can provide a bonded structure with high size precision.

In the method, however, there are several problems as follows: (1) Materials of bonded members are restricted; (2) The bonding process requires heating at a high temperature (ranging approximately from 700 to 800° C., for example); and (3) Atmosphere during the bonding process is restricted to a reduced-pressure atmosphere.

Given the problems described above, there has been a demand for a method for bonding members to each other strongly with high size precision and efficiently at a low temperature regardless of the materials of the bonded members.

SUMMARY

An advantage of the present invention is to provide a method for bonding two base members to each other strongly and efficiently with high size precision. Another advantage of the invention is to provide a bonded structure using the bonding method, and still another advantage of the invention is to provide a liquid droplet discharging head and a liquid droplet discharging apparatus applying the bonding method.

The advantages are accomplished by following aspects and features.

A bonding method according to a first aspect of the invention includes a first process that includes plasmatizing a first gas including a raw gas containing a siloxane (Si—O) bond at a reduced-pressure atmosphere, substituting the first gas by a second gas mainly including an inert gas, and plasmatizing the second gas to form a first plasma polymerized film on at least a part of a base member so as to obtain a first bonded object including the base member and the plasma polymerized film and a second process that includes preparing a second bonded object that is to be bonded to the first bonded object and pressing the first and the second bonded objects against each other such that a surface of the first plasma polymerized film is closely contacted to a surface of the second bonded object to bond the objects together.

Thereby, the two bonded objects can be bonded to each other strongly and efficiently with high size precision.

Preferably, the second bonded object includes a second base member and a second plasma polymerized film that is same as the first plasma-polymerized film and formed on the second base member, and in the second process, the first and the second bonded objects are pressed against each other such that the first and the second plasma polymerized films are closely contacted to each other.

This allows the two base members to be more strongly bonded to each other.

Preferably, the inert gas included in the second gas is nitrogen gas.

Using nitrogen gas can particularly stably generate plasma, thereby allowing activation treatment for a surface of the plasma polymerized film to be particularly evenly performed. In addition, nitrogen plasma generated by plasmatization of nitrogen gas can provide a physical impact on the surface of the plasma polymerized film to make the surface rough. This can enlarge a surface area of the plasma polymerized film to increase a density of active bonds exposed.

Preferably, the first gas further includes an inert gas that is same as the inert gas included in the second gas.

Thereby, not all the first gas needs to be substituted by the second gas, resulting in process time reduction.

Preferably, the first gas further includes an inert gas that is different from the inert gas included in the second gas.

Thereby, a most appropriate kind of gas can be used in accordance with a purpose of using each of the first and the second gases. This allows the plasma polymerized film to be efficiently formed, as well as allows a most appropriate plasma treatment to be performed for the plasma polymerized film.

Preferably, when the first gas is substituted by the second gas, the first gas is slowly substituted by the second gas while maintaining the first gas in the plasmatized condition.

Thereby, activation using plasma treatment can be secondarily performed at an end of the process of forming the plasma polymerized film, so that the process time can be significantly reduced.

Preferably, the plasmatization is performed using an action of high frequency electric power, and high frequency electric power for plasmatizing the second gas is smaller than high frequency electric power for plasmatizing the first gas.

This can suppress significant degeneration and deterioration of the plasma polymerized film and the base members due to plasma. As a result, mechanical strength reductions in the plasma polymerized film and the first base member can be prevented and there can be finally obtained a bonded structure having high bonding strength.

Preferably, the high frequency electric power for plasmatizing the second gas is 0.3 to 0.7 times as the high frequency electric power for plasmatizing the first gas.

This can optimize the high frequency electric power for plasmatizing the second gas, and can activate the plasma polymerized film without significantly deteriorating mechanical properties of the plasma polymerized film.

Preferably, a pressure of the reduced-pressure atmosphere in the first process ranges from 0.01 to 100 Pa.

This can surely prevent air-induced contamination on the first base member and the plasma polymerized film and can secure plasma density enough to form the plasma polymerized film at a sufficient film-formation rate.

Preferably, after the first process, the second process is performed while maintaining the pressure of the reduced-pressure atmosphere below an atmospheric pressure.

Thereby, the surface of the plasma polymerized film is maintained in a condition where dangling bonds are exposed. As a result, strong bonding based on the dangling bonds can be obtained between the first and the second bonded objects.

Preferably, the first and the second gases are plasmatized in a same chamber.

This can further reduce the process time, since there is no need for gas transfer between chambers.

Preferably, the raw gas is mainly made of octamethyltrisiloxane.

Thereby, the plasma polymerized film obtained is mainly made of a polymerized product of octamethyltrisiloxane and has particularly high adhesion and chemical resistance.

Preferably, the plasma polymerized film has an average thickness ranging from 10 to 10,000 nm.

This can prevent significant reduction in the size precision of the bonded structure, as well as enables the first and the second bonded objects to be more strongly bonded together.

A bonded structure according to a second aspect of the invention is obtained by bonding the first and the second bonded objects to each other using the bonding method according to the first aspect of the invention.

Thereby, there can be obtained a bonded structure in which the two base members are strongly bonded to each other with high size precision.

A liquid droplet discharging head according to a third aspect of the invention includes a nozzle plate, a cavity substrate, and a vibration plate, at least one of bonding between the nozzle plate and the cavity substrate and bonding between the cavity substrate and the vibration plate being performed using the bonding method according to the first aspect of the invention.

Thereby, there can be provided a highly reliable liquid droplet discharging head.

A liquid droplet discharging apparatus according to a fourth aspect of the invention includes the liquid droplet discharging head according to the third aspect of the invention.

Thereby, there can be provided a highly reliable liquid droplet discharging apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described in detail with reference to the attached drawings.

Bonding Methods

In a bonding method according to a first embodiment of the invention, two base members (a first base member 21 and a second base member 22) are bonded together via plasma polymerized films 31 and 32. The method allows the two base members 21 and 22 to be bonded strongly and efficiently with high size precision.

Before describing the bonding method of the first embodiment, a description will be first given of a plasma polymerization apparatus used to form the plasma polymerized films 31 and 32.

Figure 1:
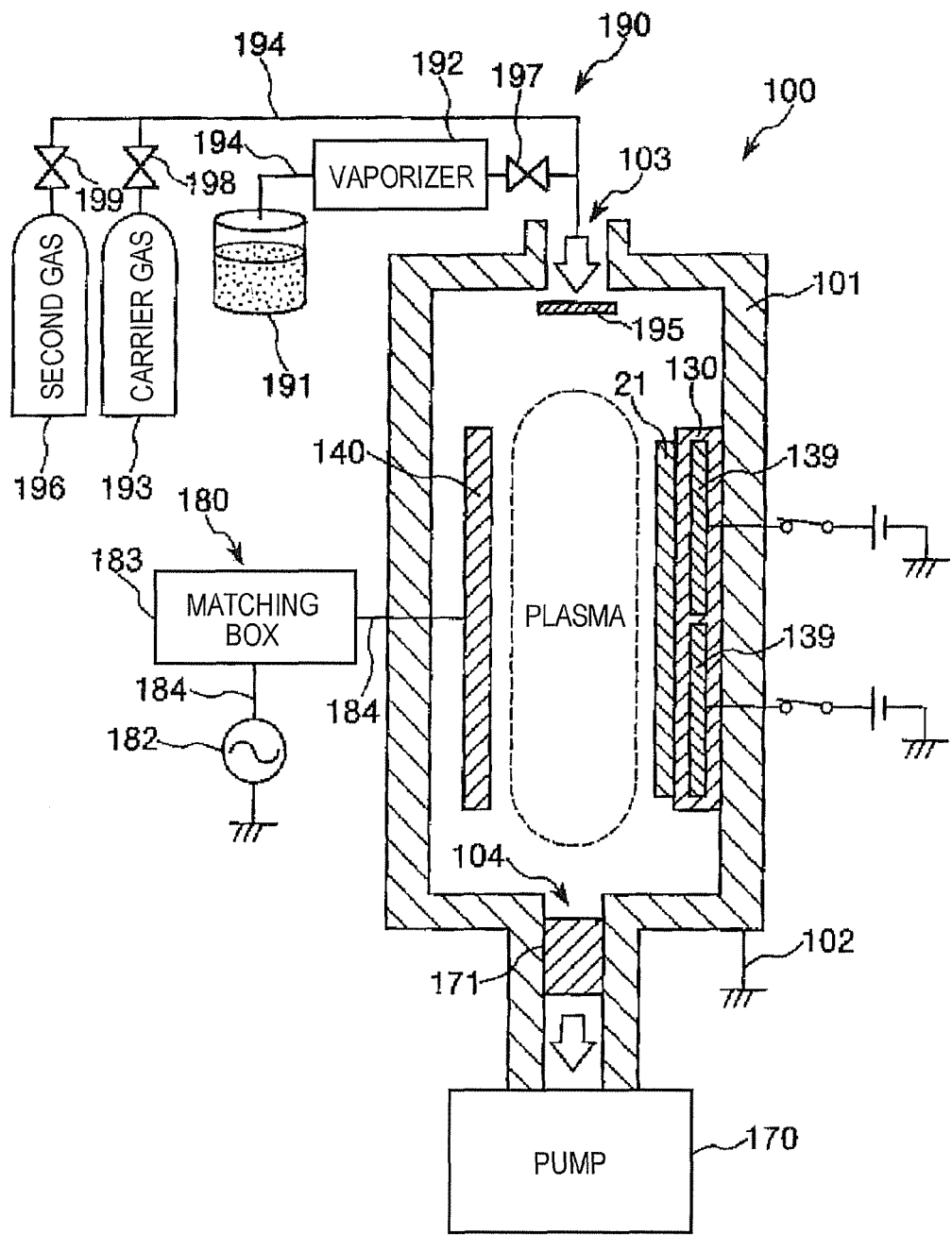
FIG. 1 is a longitudinal sectional view schematically showing a plasma polymerization apparatus used for a bonding method according to a first embodiment of the invention.

FIG. 1 is a longitudinal sectional view schematically showing the plasma polymerization apparatus used for the bonding method of the first embodiment. In a description below, upper and lower sides, respectively, in FIG. 1, will be referred to as "upper" and "lower", respectively.

A plasma polymerization apparatus ° shown in FIG. 1 includes a chamber 101, a first electrode 130 supporting the first base member 21, a second electrode 140, electrodes 130, 140, a power supply circuit 180 applying a high frequency voltage between the electrodes 130 and 140, a gas supplying section 190 supplying a gas into the chamber 101, and a vacuum pump 170 exhausting the gas in the chamber 101. Among those components, the first and the second electrodes 130 and 140 are provided in the chamber 101. Hereinafter, details of the components will be described.

The chamber 101 is a container that maintains air tightness inside the chamber and is used in a condition where a pressure inside the chamber is reduced (in a vacuum condition), whereby the chamber 101 can have pressure resistance capable of enduring against a pressure difference between inside and outside the chamber.

The chamber 101 shown in FIG. 1 includes a chamber main body having an approximately cylindrical shape whose axial line is arranged in a horizontal direction, a circular side wall sealing a left opening portion of the chamber main body and a circular side wall sealing a right opening portion thereof.

At a top part of the chamber 101 is provided a supply outlet 103 and at a bottom part thereof is provided an exhaustion outlet 104. The supply outlet 103 is connected to a gas supplying section 190, and the exhaustion outlet 104 is connected to the vacuum pump 170.

In the present embodiment, the chamber 101 is a highly conductive metal and electrically grounded via a ground line 102.

The first electrode 130 is plate-shaped and supports the first base member 21.

The first electrode 130 is vertically provided on an inner wall surface of one of the side walls, as well as is electrically grounded via the chamber 101. As shown in FIG. 1, the first electrode 130 is arranged concentrically with respect to the chamber main body.

On a surface of the first electrode 130 supporting the first base member 21 is provided an electrostatic chuck (an adsorption mechanism) 139.

The electrostatic chuck 139 allows the first base member 21 to be vertically supported, as shown in FIG. 1. Even if the first base member 21 is slightly curved, the electrostatic chuck can adsorb the first base member 21 such that the curve is corrected, so as to allow the base member 21 to be subjected to plasma treatment.

The second electrode 140 is provided facing the first electrode 130 vi the first base member 21 in a condition distant (insulated) from an inner wall surface of the other side wall of the chamber 101.

The second electrode 140 is connected to a high frequency power supply 182 via a wiring 184. At a predetermined point of the wiring 184 is provided a matching box 183. The wiring 184, the high frequency power supply 182, and the matching box 183 forms a power supply circuit 180.

In the power supply circuit 180, the first electrode 130 is grounded. Thus, high frequency electric power is applied between the first and the second electrodes 130 and 140. Thereby, an electric field is induced in a space between the first and the second electrodes 130 and 140. A direction of the electric field is reversed at high frequency.

The gas supplying section 190 supplies a predetermined gas into the chamber 101.

The gas supplying section 190 shown in FIG. 1 includes a reservoir section 191 storing a liquid film material (a raw material liquid), a vaporizer 192 vaporizing the liquid film material to change the material into a gas, a gas cylinder 193 storing carrier gas, and a gas cylinder 196 storing the second gas. Those sections are connected to the supply outlet 103 of the chamber 101 via each pipe 194 such that a mixture gas of a gaseous film material (a raw gas) and the carrier gas (the first gas) and the second gas are supplied from the supply outlet 103 into the chamber 101.

The pipe 194 between the supply outlet 103 and the vaporizer 192 has a valve 197 to adjust a raw gas flow rate in accordance with an open extent of the valve 197.

In addition, between the supply outlet 103 and the gas cylinder 193 and between the supply outlet 103 and the gas cylinder 196, respectively, are provided a valve 198 and a valve 199, respectively to adjust respective amounts of the carrier gas and the second gas flown in accordance with open extents of the valves 198 and 199, respectively.

Using electromagnetic valves capable of electrically controlling the open extents as the respective valves 197, 198, and 199 allows the amounts of the raw gas, the carrier gas, and the second gas flown to be controlled in a concerted manner, thereby enabling compositions and amounts of the gases supplied to be highly controlled.

The liquid film material stored in the reservoir section 191 is polymerized by the plasma polymerization apparatus 100 to be converted to a raw material for forming a polymerized film on a surface of the first base member 21.

The liquid film material as above is vaporized by the vaporizer 192 into a gaseous film material (the raw gas) to be supplied into the chamber 101. The raw gas will be described later below.

The carrier gas stored in the gas cylinder 193 discharges electricity due to influence of the electric field and thus is introduced to maintain the electric discharge.

Near the supply outlet 103 in the chamber 101 is disposed a diffusion plate 195.

The diffusion plate 195 serves to promote diffusion of the mixture gas supplied in the chamber 101. Consequently, the mixture gas can be diffused with an approximately even concentration in the chamber 101.

The vacuum pump 170 exhausts air in the chamber 101. For example, the vacuum pump 170 is an oil-sealed rotary vacuum pump, a turbo-molecular pump, or the like. In this manner, exhausting air in the chamber 101 to reduce pressure thereinside can facilitate plasmatization of an introduced gas. In addition, contamination, oxidization, or the like of the first base member 21 due to contact with the air atmosphere can be prevented, as well as a reaction product formed by plasma treatment can be effectively removed outside the chamber 101.

Furthermore, the exhaustion outlet 104 has a pressure control mechanism 171 adjusting the pressure inside the chamber 101. Thereby, the pressure inside the chamber 101 can be appropriately determined in accordance with operating conditions of the gas supplying section 190.

First Embodiment

Next will be described the bonding method according to the first embodiment based on an example of the plasma polymerization apparatus 100.

FIGS. 2A to 2C and FIGS. 3A and 3B are longitudinal sectional views for illustrating the bonding method of the first embodiment. In the description below, upper and lower sides respectively in the drawings will be referred to as "upper" and "lower", respectively.

The bonding method of the first embodiment includes a first process that includes forming the plasma polymerized film 31 on the surface of the first base member 21 to obtain a first bonded object 41 and a second process that includes forming the plasma polymerized film 32, which is the same as the plasma polymerized film 31, on a surface of the second base member 22 to obtain a second bonded object 42 and bonding the first and the second bonded objects 41 and 42 to each other such that the plasma polymerized films 31 and 32 are closely contacted to each other so as to obtain a bonded structure 1. Each process will be sequentially described below.

First, at step 1, the first base member 21 is prepared that has a plate shape. Examples of materials for the first base member 21 include polyolefins such as polyethylene, polypropylene, ethylene-propylene copolymer, and ethylene-vinyl acetate copolymer (EVA); polyesters such as cyclo-polyolefin, modified-polyolefin, polyvinyl chloride, polyvinylidene chloride, polystyrene, polyamide, polyimide, polyamide-imide, polycarbonate, poly-(4-methylpentene-1), ionomer, acryl resin, polymethyl methacrylate, acrylonitrile-butadiene-styrene copolymer (ABS resin), acrylonitrile-styrene copolymer (AS resin), butadiene-styrene copolymer, polyoxymethylene, polyvinyl alcohol (PVA), ethylene-vinyl alcohol copolymer (EVOH), polyethylene terephthalate (PET), polyethylene naphthalate, polybutylene terephthalate (PBT), and polycyclohexylenedimethylene terephthalate (PCT); thermosetting elastomers such as polyether, polyetherketone (PEK), polyether ether ketone (PEEK), polyetherimide, polyacetal (polyoxymethylene: POM), polyphenyleneoxide, modified-polyphenyleneoxide, polysulfone, polyethersulfone, polyphenylene sulfide, polyarylate, aromatic polyester (liquid crystal polymer), polytetrafluoroethylene, polyvinylidene fluoride, other fluororesins, stylenes, polyolefins, polyvinyl chlorides, polyurethanes, polyesters, polyamides, polybutadienes, trans-polyisoprenes, fluoro rubber, and chlorinated polyethylene; resins such as epoxy resin, phenol resin, urea resin, melamine resin, aramid resin, unsaturated polyester, silicone resin, polyurethane, copolymers mainly containing them, polymer blends, and polymer alloys; metals such as Fe, Ni, Co, Cr, Mn, Zn Pt, Au, Ag, Cu, Pd, Al, W, Ti, V, Mo, Nb, Zr Pr, Nd, and Sm, alloys of the metals, metallic materials such as carbon steel, stainless steel, indium-tin oxide (ITO), and gallium arsenide, silicon materials such as monocrystalline silicon, polycrystalline silicon, and amorphous silicon; glass materials such as borosilicate glass (silica glass), alkaline silicate glass, soda-lime glass, potash-lime glass, lead-alkali glass, barium glass, and borosilicate glass; ceramic materials such as alumina, zirconia, ferrite, silicon nitride, aluminum nitride, boron nitride, titanium nitride, silicon carbide, boron carbide, titanium carbide, tungsten carbide; carbon materials such as graphite, and composite materials including a combination of one kind or two or more kinds of the materials.

The surface of the first base member 21 may be subjected to plating such as Ni plating, passivation such as chromating, nitriding, or the like.

In addition, the shape of the first base member 21 is not restricted to a plate-like shape as long as the first base member has a surface supporting the plasma polymerized film 31. For example, the base member may be block-shaped, bar-shaped, or the like.

In the present embodiment, since the first base member 21 is plate-shaped, the member can be easily bent, and thus, is sufficiently deformable along the shape of the second base member 22, thereby further increasing adhesion between the first and the second base members 221 and 22. Bending of the first base member 21 can mitigate stress occurring on a bonding interface to some extent.

In this case, an average thickness of the first base member 21 is not specifically restricted, but ranges preferably approximately from 0.01 to 10 mm and more preferably approximately from 0.1 to 3 mm. Additionally, preferably, an average thickness of the second base member 22 described below is also included in the same range as in the average thickness of the first base member 21.

Preferably, in advance, before forming the plasma polymerized film 31, a bonded surface 23 of the first base member 21 is subjected to surface treatment for increasing adhesion between the first base member 21 and the plasma polymerized film 31 according to the material of the first base member 21.

For example, such a surface treatment may be a physical surface treatment such as sputtering or blast treatment, a plasma treatment using oxygen plasma or nitrogen plasma, a chemical surface treatment such as corona discharge, etching, electron beam radiation, UV radiation, ozone exposure, or a combination of those treatments. Performing any one of the surface treatment leads to further cleaning of a region of the first base member 21 where the plasma polymerized film 31 is to be formed and further activation of the region. This can increase the bonding strength between the first and the second bonded objects 41 and 42.

When the first base member 21 subjected to the surface treatment is made of a resin (a high polymer), particularly, corona discharge treatment, nitrogen plasma treatment, or the like may be suitably used.

Depending on the material for the first base member 21, without such a surface treatment, the bonding strength of the plasma polymerized film 31 can be sufficiently increased. The materials for the first base member 21 having the advantageous effect may be those mainly containing the metallic materials, the silicon materials, the glass materials, or the like.

The surface of the first base member 21 made of any of the above materials is covered with an oxide film and is bonded to a relatively highly active hydroxyl group. Thus, using the first base member 21 made of such a material enables the plasma polymerized film 31 to be formed so as to strongly adhere to the bonded surface 23 of the first base member 21 without performing the surface treatment.

In this case, an entire part of the first base member 21 may not necessarily be made of any of the materials above. It is only necessary that at least a part of the base member 21 near the bonded surface 23 may be made of any of the materials.

As an alternative to the surface treatment, an intermediate layer may be formed in advance on the bonded surface 23 of the first base member 21.

The intermediate layer can have any function, and for example, preferably, has a function of increasing the adhesion with the plasma polymerized film 31, a cushioning function (a buffer function), a function of mitigating stress concentration, or the like. As a result, the first base member 21 is bonded to the plasma polymerized film 31 via the intermediate layer formed as above. Then, finally, the bonded structure 1 can be highly reliable.

Examples of a material for the intermediate layer include metals such as aluminum and titanium, oxide materials such as an metal oxide and a silicon oxide, nitride materials such as a metal nitride and a silicon nitride, carbons such as graphite and diamond carbon, and self-organizing film materials such as a silane coupling agent, a thiol compound, a metal alkoxide, and a metal-halogen compound, resin materials such as resin adhesives, resin films, resin coating materials, rubber materials, and elastomers. Among them, one kind thereof or a combination of two or more kinds thereof may be used as the material for the intermediate layer.

Among those kinds of the materials, using the oxide materials for the intermediate layer can particularly increase the bonding strength between the first base member 21 and the bonding film 3.

Next, at step 2, the first base member 21 is stored in the chamber 101 and the vacuum pump 170 exhausts air in the chamber 101 to set an inside atmosphere of the chamber 101 to a pressure-reduced atmosphere.

Figure 2A:
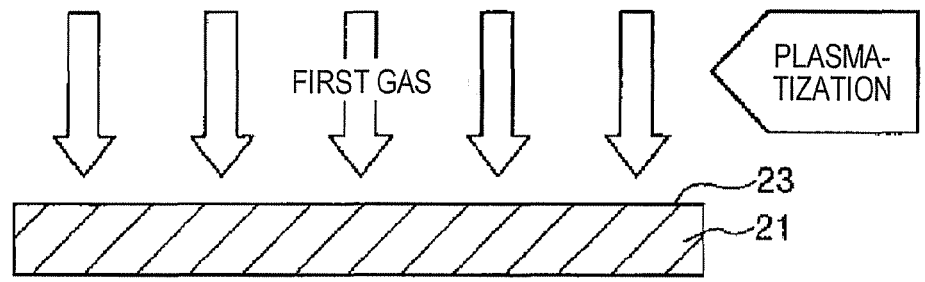
FIGS. 2A to 2C are longitudinal sectional views for illustrating the bonding method according to the first embodiment.

Next, the gas supplying section 190 is operated to supply the first gas (a mixture gas of the raw gas and the carrier gas) into the chamber 101, as shown in FIG. 2A.

A ratio of the raw gas in the mixture gas (a mixture ratio) varies slightly depending on kinds of the raw gas and the carrier gas, an intended film-formation rate, and the like. For example, the ratio of the raw gas in the mixture gas ranges preferably approximately from 20 to 70%, and more preferably approximately from 30 to 60%. Thereby, conditions for formation of the polymerized film (film-formation) can be optimized.

A first-gas supply rate is appropriately determined by a kind of the gas, an intended film-formation rate, a film thickness, and the like, and is not restricted to a specific amount. Usually, the flow rate of each of the raw gas and the carrier gas ranges preferably approximately from 1 to 100 ccm and more preferably approximately from 10 to 60 ccm.

Then, the power supply circuit 180 is operated to apply a high frequency voltage between the pair of electrodes 130 and 140. Thereby, gas particles existing between the electrodes 130 and 140 are ionized, whereby plasma is generated. Energy of the plasma causes the particles of the raw gas to be polymerized (plasma polymerization) and a polymerized product is bonded to and deposited on the first base member 21.

Figure 2B:
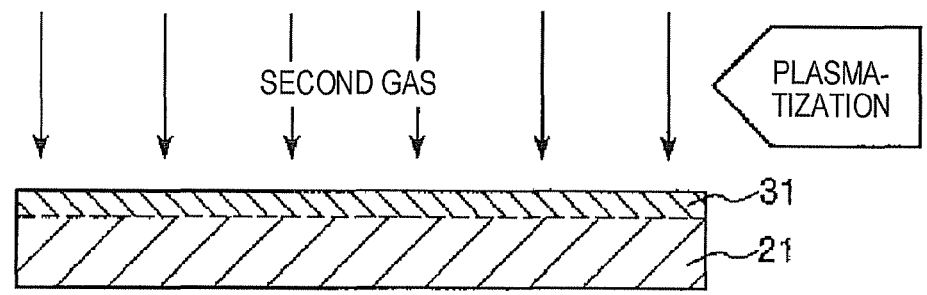

Next, the first gas is substituted by the second gas in a condition where the first gas is plasmatized. As a result, as shown in FIG. 2B, the plasma polymerized film 31 is formed on at least a part of the bonded surface 23 (an entire surface of the bonded surface 23 in the embodiment) of the first base member 21 (the first process). Then, there can be obtained the first bonded object 41 having the first base member 21 and the plasma polymerized film 31.

The plasma polymerized film 31 can be obtained by supplying the mixture gas (the first gas) of the raw gas and the carrier gas into the electric field and then slowly substituting the first gas by the second gas to polymerize the particles of the raw gas and activate the particles. In this method, with an action of the plasma, the bonded surface 23 of the first base member 21 is cleaned and activated or made rough. Thus, the polymerized product of the raw gas can be strongly bonded to the bonded surface 23. Consequently, regardless of the material of the first base member 21, the adhesion between the bonded surface 23 and the plasma polymerized film 31 can be improved. Additionally, the plasma activates a surface of a deposit, whereby the plasma polymerized film 31 becomes adhesive to the other bonded object (the second base member 42 in the embodiment).

In that case, "activating" the surface of the deposit means a condition where a molecular bond broken in the surface and inside of the deposit generates a non-terminated bond (hereinafter referred to as "non-bonding portion" or "dangling bond") in the deposit, a condition where the non-bonding portion is terminated by a hydroxyl group (an OH group), or a coexistence of those conditions. A presence of such a dangling bond or a bond by a hydroxyl group or the like enables the plasma polymerized film 31 to be particularly strongly bonded to the second bonded object 42

For example, the condition where a dangling bond is terminated by a hydroxyl group can be easily generated by taking out the plasma polymerized film 31 having the dangling bond from the chamber 101 to expose to an air (a water vapor-containing gas).

The raw gas may be any of gases including organosiloxane such as methylsiloxane, octamethyltrisiloxane, decamethyltetrasiloxane, decamethylcyclopentasiloxane, octamethylcyclotetrasiloxane, and methylphenylsiloxane, for example.

Meanwhile, a preferable carrier gas may be an inert gas such as helium gas, argon gas, or nitrogen gas. Using such an inert gas allows plasma to be stably generated between the electrodes 130 and 140. In addition, the inert gas hardly reacts with other substances, and thus using the inert gas can prevent an undesired reaction between the carrier gas and the raw gas, a reaction of the carrier gas with respect to the inner wall of the chamber 101, or the like.

Consequently, the plasma polymerized film 31 obtained using the raw gas as above is made of a product obtained by polymerization of those materials, that is, the film 31 is made of polyorganosiloxane. Thereby, the plasma polymerized film 31 allows the first base member 21 and the second bonded object 42 to be more strongly bonded to each other.

Additionally, polyorganosiloxane is relatively flexible. Thus, for example, polyorganosiloxane can mitigate stress between the first and the second base members 21 and 22 caused by thermal expansion even when the base members are made of a different material. This can ensure prevention of separation in the bonded structure 1 finally obtained.

Furthermore, polyorganosiloxane has high chemical resistance. Thus, the compound can be effectively used for bonding of members exposed to chemicals or the like for a long period. Specifically, for example, in production of a liquid droplet discharging head for an industrial inkjet printer using an organic ink apt to erode resin, using the plasma polymerized film 31 mainly made of polyorganosiloxane can improve durability of the head.

Preferably, the raw gas is particularly mainly made of octamethyltrisiloxane. The plasma polymerized film mainly made of a polymerized product of octamethyltrisiloxane has particularly high adhesion and chemical resistance and thus can be favorably used in the bonding method of the embodiment. In addition, a raw material mainly containing octamethyltrisiloxane is in a liquid state at room temperature and has a moderate viscosity. Accordingly, the raw material can be easily used.

The first gas may include at least one other gas such as oxygen gas according to need.

In plasma polymerization, a frequency of the high frequency voltage applied between the electrodes 130 and 140 is not specifically restricted, but ranges preferably approximately from 1 kHz to 100 MHz and more preferably approximately from 10 to 60 MHz.

An output density of the high frequency is not specifically restricted, but ranges preferably approximately from 0.01 to 10 W/cm$^2$ and more preferably approximately from 0.1 to 1 W/cm$^2$.

The raw gas flow rate ranges preferably approximately from 0.5 to 200 sccm and more preferably approximately from 1 to 100 sccm, and the carrier gas flow rate ranges preferably approximately from 5 to 750 sccm and more preferably approximately from 10 to 500 sccm.

Treatment time ranges preferably approximately from 1 to 10 minutes and more preferably approximately from 4 to 7 minutes. A thickness of the plasma polymerized film 31 formed is mainly proportional to the treatment time. Accordingly, only adjusting the treatment time can facilitate adjustment of the thickness of the plasma polymerized film 31. Thereby, in the bonded structure 1 finally obtained, a distance between the first base member 21 and the second bonded object 42 bonded to the base member 21 can be strictly controlled.

A temperature for the first base member 21 is preferably equal to or higher than 25° C. and ranges more preferably approximately from 25 to 100° C.

Setting those conditions appropriately allows the dense plasma polymerized film 31 to be evenly formed.

An inside pressure of the chamber 101 during formation of the plasma polymerized film 31 ranges preferably from 0.01 to 100 Pa and more preferably from 0.1 to 10 Pa. Setting the inside pressure of the chamber 101 in the range ensures prevention of contamination of the first base member 21 and the plasma polymerized film 31 due to the air and also enables plasma concentration to be sufficiently maintained, thereby forming the plasma polymerized film 31 at a sufficient film-formation rate. In other words, a contamination rate and a film-formation rate having a trade-off relationship can be optimized.

Meanwhile, the second gas mainly contains an inert gas. The inert gas hardly reacting with other substances can serve to prevent the second gas from undesirably reacting with the plasma polymerized film 31 or from reacting with the inner wall of the chamber 101.

In addition, the inert gas can stably generate plasma. Thus, even plasma treatment can be performed on the plasma polymerized film 31. This can evenly activate the surface of the plasma polymerized film 31 and thus can provide an even adhesion.

For example, the inert gas as above may be helium gas, argon gas, or nitrogen gas.

Among the examples, the nitrogen gas is preferably used as the inert gas. The nitrogen gas can particularly stably generate plasma, so that activation can be particularly evenly performed on the surface of the plasma polymerized film 31. In addition, nitrogen plasma obtained by plasmatization of nitrogen gas can provide a physical impact (ion impact) on the surface of the plasma polymerized film 31, so that the surface can be made rough. As a result, the surface area of the plasma polymerized film 31 can be enlarged to increase the density of an active bond exposed.

Using oxygen gas, argon gas, helium gas, or the like as the second gas allows the activation of the surface of the plasma polymerized film 31, but the activation tends to be excessive, whereby the plasma polymerized film 31 can be degenerated or deteriorated. However, when nitrogen gas is used as the second gas, nitrogen radicals form Si—N bonds on the surface of the plasma polymerized film 31, in addition to the activation of the surface of the plasma polymerized film 31. Once the Si—N bonds are formed, deterioration of the plasma polymerized film 31 due to the plasma can be suppressed. Accordingly, in the plasma polymerized film 31, reduction in mechanical properties of the film itself can be suppressed, thereby preventing reduction in the bonding strength.

In addition, the plasma polymerized film 31 having the Si—N bonds is hardly influenced by oxygen, water, or the like. Thus, even if the plasma polymerized film 31 after being formed and activated is exposed to the air, the plasma polymerized film 31 is not degenerated or deteriorated by oxygen or water. Accordingly, the plasma polymerized film 31 with the Si—N bonds can be more weather-resistant even when taken out from the chamber 101 to be exposed to the air. Furthermore, the plasma polymerized film 31 having the Si—N bonds as described above can be highly chemical resistant and highly alkali-resistant.

If the ion impact caused by the nitrogen plasma as above needs to be suppressed, following processings may be performed. When nitrogen gas is introduced as the second gas, instead of applying a high frequency voltage between the electrodes 130 and 140, nitrogen plasma generated in a position apart from the first base member 21 is discharged to the plasma polymerized film 31. The plasma generated in such a position is a so-called "remote plasma". Then, the remote plasma can be used to perform nitrogen plasma activation on the surface of the plasma polymerized film 31. The remote plasma does not cause any ion-impact-induced deterioration in the coating film formed using the first gas and can provide the described-above weather resistance, chemical resistance, and alkali resistance.

The inert gas included in the second gas may be same as or different from the inert gas included in the first gas.

When the inert gas of the second gas is the same as that of the first gas, the same inert gas can be continuously used in substitution of the first gas by the second gas. In other words, in the present embodiment, when the first gas is substituted by the second gas, only the raw gas flow rate is slowly reduced in the first gas, whereby only the carrier gas (the inert gas) remains.

Accordingly, in order to substitute the first gas by the second gas, it is only necessary to stop supply of the raw gas and it is unnecessary to substitute all the first gas in the chamber 101 by using the second gas. This can reduce the process time.

Furthermore, using the same kind of inert gas in both the first and the second gases allows a film quality of the plasma polymerized film 31 to be equalized in a thickness direction of the film. Then, equalizing the quality of the plasma polymerized film 31 can inhibit change in the film quality, so that reduction in mechanical properties of the film 31 due to such a change can be prevented.

Meanwhile, when the inert gas of the second gas is different from that of the first gas, a most appropriate kind of gas can be used as each inert gas in accordance with respective purposes of the first and the second gases.

In this case, as a preferable inert gas included in the first gas, a most appropriate kind of gas as the carrier gas in formation of the plasma polymerized film 31 can be suitably selected. For the inert gas of the second gas, preferably, a most appropriate kind of gas can be suitably selected to perform plasma treatment for the plasma polymerized film 31, such as the above-described nitrogen gas.

In this manner, the plasma polymerized film 31 can be efficiently formed, as well as a most appropriate plasma treatment can be performed on the plasma polymerized film 31.

Additionally, using the different inert gas in each of the first and the second gases allows the film quality to change in the thickness direction in the formation of the plasma polymerized film 31. For example, when the first gas includes argon gas and the second gas includes nitrogen gas, a surface of the plasma polymerized film 31 adjacent to the first base member 21 has dominantly a siloxane structure, whereas a surface of the plasma polymerized film 31 opposite to the surface adjacent to the member 21 has dominantly a structure including relatively many Si—N bonds.

Preferably, the substitution of the first gas by the second gas is continuously performed. In other words, preferably, the first gas is slowly substituted by the second gas while maintaining the first gas in the plasmatized condition. In this manner, at the end of the process of forming the plasma polymerized film 31, activation using plasma treatment can be secondarily performed, thereby significant reducing the process time. Additionally in the embodiment, the first gas and the second gas are plasmatized in the same chamber 101. Accordingly, since there is no need for gas transfer between chambers, the process time can be further reduced.

Furthermore, the gas substitution is slowly performed to continue changes from the siloxane structure to the Si—N bond structure. This can ensure prevention of reduction in the mechanical properties of the plasma polymerized film 31 at a changing point of the molecular structure.

Figure 4A:
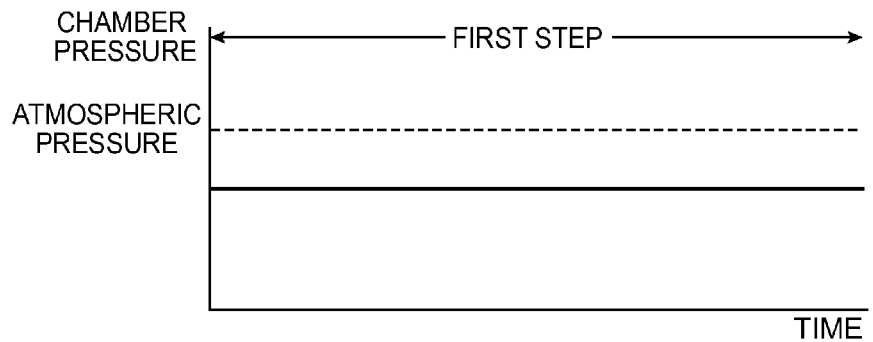
FIGS. 4A to 4C are schematic charts for illustrating an atmosphere inside a chamber, a mixed condition of a first gas and a second gas, and a change in high frequency electric power for plasmatizing each gas, when the first gas is substituted by the second gas.
Figure 4B:
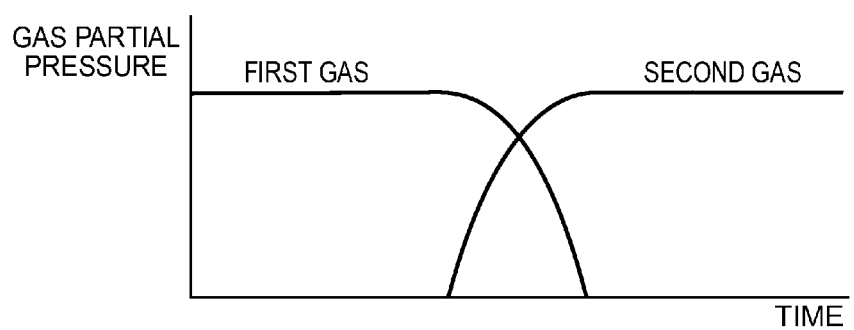

FIGS. 4A and 4B are schematic charts illustrating an atmosphere inside the chamber 101 and a mixed condition of a first gas and a second gas when the first gas is substituted by the second gas.

The gas substitution is described in details with reference to the drawings. During a time in which the first gas is slowly substituted by the second gas, both gases become mixed together. In the condition of a mixture of the gases, since the plasma polymerization and the plasma treatment are concurrently performed, activation is performed on not only the surface of the plasma polymerized film 31 but also on an inside of the film 31. Thereby, the surface and inside of the plasma polymerized film 31 have distributions of bonds. Thus, a bond content rate in the plasma polymerized film 31 is increased and the inner bonds also contribute to bonding, thus increasing bonding strength of the plasma polymerized film 31 to the second bonded object 42. This allows the first and the second bonded objects 41 and 42 to be more strongly bonded to each other, resulting in formation of the bonded structure 1.

In addition, plasma conditions may be different or the same between plasmatization of the first gas and plasmatization of the second gas.

For example, the plasma conditions include an output of the high frequency voltage applied between the pair of electrodes 130 and 140, a distance between the electrodes 130 and 140, a flow rate of the first or the second gas, an inside pressure of the chamber 101, and the like.

Among those conditions, preferably, high frequency electric power for plasmatizing the second gas is made smaller than that for plasmatizing the first gas. This can suppress significant degeneration or deterioration due to plasma in the plasma polymerized film 31 and the first base member 21 when the second gas is plasmatized. Consequently, mechanical strength reduction of the plasma polymerized film 31 and the first base member 21 can be prevented, thereby finally obtaining the bonded structure 1 having high bonding strength.

Specifically, the high frequency electric power for plasmatizing the second gas ranges preferably approximately from 0.3 to 0.7 times the high frequency electric power for plasmatizing the first gas, and more preferably approximately from 0.4 to 0.6 times as that for plasmatizing the first gas. Setting the high frequency electric power in the range can optimize the high frequency electric power. Thus, the plasma polymerized film 31 can be activated without significantly reducing the mechanical properties of the plasma polymerized film 31 and the first base member 21.

If the high frequency electric power is below a lower limit value of the range, the output becomes too low, so that the plasma polymerized film 31 cannot be sufficiently activated. Conversely, when the high frequency electric power exceeds an upper limit value of the range, the output power becomes too high, whereby the plasma polymerized film 31 can be degenerated or deteriorated.

Figure 4C:
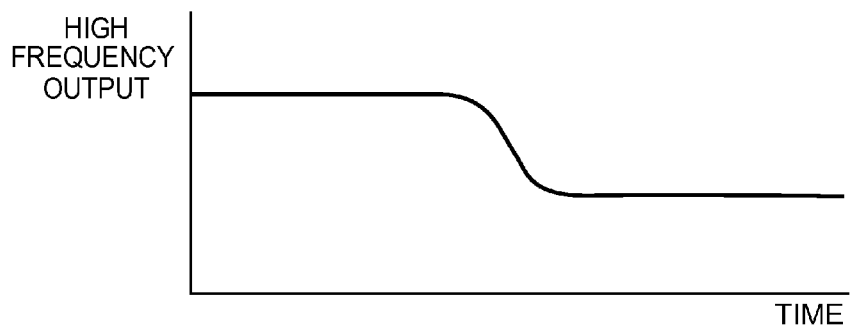

FIG. 4C is a schematic chart showing a change in the high frequency electric power for plasmatizing each of the first and the second gases when the first gas is substituted by the second gas.

As shown in FIG. 4C, in the substitution of the first gas by the second gas, preferably, preferably, the high frequency electric power is slowly or gradually reduced. In this manner, the structure (composition) of the plasma polymerized film 31 is continuously formed in the thickness direction of the film, and thus, the film 31 has particularly excellent mechanical properties.

Preferably, the plasma polymerized film 31 has an average thickness ranging approximately from 10 to 10,000 nm and more preferably approximately from 50 to 5,000 nm. Setting the average thickness of the plasma polymerized film 31 in the range can prevent a significant reduction in the size precision of the bonded structure 1 obtained by bonding the first and the second base members 21 and 22 to each other, as well as can further increase the bonding between the base members 21 and 22.

If the average thickness of the plasma polymerized film 31 is below a lower limit value of the range, the bonding strength can probably be insufficient. Meanwhile, if the average thickness thereof is over an upper limit value of the range, the size precision of the bonded structure 1 may be significantly reduced.

The plasma polymerized film 31 having the average thickness set in the range maintains shape followability to some extent. Accordingly, for example, even when an uneven spot exits on the bonded surface 23 of the first base member 21, the plasma polymerized film 31 can be bonded onto the bonded surface 23 in a manner following a shape of the uneven spot, in accordance with a height of the uneven spot. As a result, the plasma polymerized film 31 engulfs the uneven spot to mitigate the height of the uneven spot formed on the surface thereof.

The shape followability as above becomes more apparent as the thickness of the plasma polymerized film 31 is increased. Thus, in order to maintain an sufficient shape followability, the thickness of the film 31 needs to be as large as possible.

In addition, as mentioned above, the plasma polymerized film 31 is a dense solid having no fluidity. Accordingly, as compared to conventional liquid or paste adhesives having fluidity, the plasma polymerized film 31 is characterized by that the thickness and the shape of the film do not almost change. Thereby, the bonded structure 1 obtained by bonding via the plasma polymerized film 31 has extremely high size precision as compared to conventional bonded structures. Furthermore, since the time for curing an adhesive is unnecessary, the bonding process can be performed in a short time.

The plasma polymerized film 31 as above is a polymerized product including a siloxane (Si—O) bond, and the composition of the film 31 changes in accordance with a composition of the raw gas and plasma conditions. Accordingly, factors influential to the composition of the plasma polymerized film 31, such as the composition of the raw gas and the plasma conditions, are controlled based on viewpoints as below.

Specifically, in the composition of the plasma polymerized film 31, among all atoms excluding H atoms, a sum of an Si-atom content rate and an O-atom content rate ranges preferably approximately from 10 to 90 in atomic percentage, and more preferably approximately from 20 to 80 in atomic percentage. The plasma polymerized film 31 including Si atoms and O atoms in the above content rate range has particularly high strength because of formation of a strong network between the Si atoms and the O atoms. Thereby, the bonding strength of the bonded structure 1 can be further improved.

A ratio of the Si atoms to the O atoms in the plasma polymerized film 31 is preferably approximately 3:7 to 7:3 and more preferably approximately 4:6 to 6:4. Setting the ratio between the Si atoms and the O atoms in the range allows a three-dimensional network structure having siloxane bonds to be further stabilized, thereby improving the mechanical properties of the plasma polymerized film 31. Thus, the first and the second bonded objects 41 and 42 can be more strongly bonded to each other.

The plasma polymerized film 31 is formed by depositing the plasmatized raw gas at random on the bonded surface 23 of the first base member 21. Accordingly, the atoms are distributed at random in the film. Thereby, the plasma polymerized film 31 is highly resistant to destruction due to local disorders or defects in an atomic arrangement as in a crystalline material, thus exhibiting high mechanical strength and flexibility.

The plasma polymerized film 31 has a crystallinity preferably equal to or less than 45% and more preferably equal to or less than 40%. Thereby, the atomic arrangement of the plasma polymerized film 31 can be thought to be sufficiently at random, thus exhibiting functions and effects brought by the random atomic arrangement as described above. Accordingly, using the plasma polymerized film 31 thud formed allows the bonding strength of the bonded structure 1 to be further improved.

The present embodiment has described the method for forming the plasma polymerized film 31 by plasmatizing the first and the second gases using electric discharge (electric energy). However, alternatively, the first and the second gases may be plasmatized using heat energy or light energy.

Next, at step 3, the second bonded object 42 is prepared by forming a plasma polymerized film 32 on the second base member 22.

The plasma polymerized film 32 is formed in the same manner as that for forming the plasma polymerized film 31 described above.

Figure 2C:
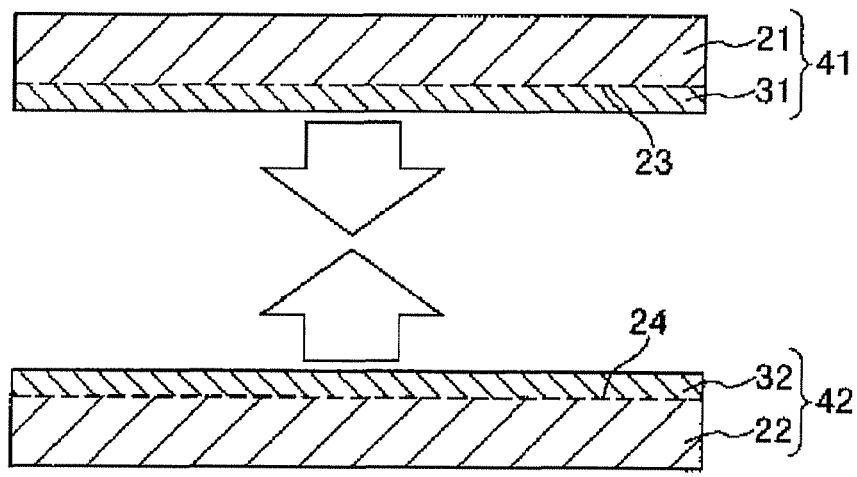
Figure 3A:
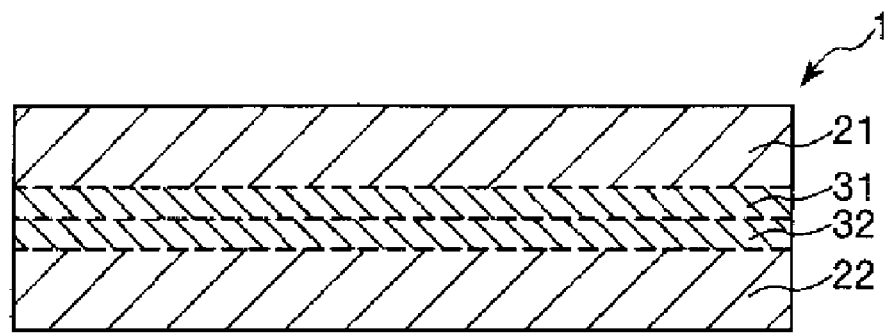
FIGS. 3A and 3B are longitudinal sectional views for illustrating the bonding method according to the first embodiment.

Then, as shown in FIG. 2C, the first and the second bonded objects 41 and 42 are bonded to each other such that the plasma polymerized film 31 is closely contacted to the plasma polymerized film 32. As a result, the bonded structure 1 can be obtained (the second process), as shown in FIG. 3A.

When the plasma polymerized films 31 and 32 are closely contacted to each other, active bonds generated on each surface and each inside of the films, such as dangling bonds, hydroxyl groups, or the like, are bound to each other, thereby allowing the films 31 and 32 to be strongly bonded together.

Particularly, the plasma polymerized films 31 and 32 are bonded to each other by recombination between dangling bonds, the dangling bonds on the surface and the inside of each of the films 31 and 32 contribute to the bonding between the films. The recombination between the dangling bonds occurs in an intricate manner such that the dangling bonds overlap (become entangled with) each other, thereby forming a three-dimensional network bonding on bonding interfaces between the films. Consequently, the interfaces of the plasma polymerized films 31 and 32 are bonded together so as to be almost integrated with each other. This allows the bonding between the first and the second bonded objects 41 and 42 to be extremely strengthened.

The first bonded object 41 obtained by the first process is subjected to the second process after taken out from the chamber 101. Activated conditions of the active bonds on the surface of the plasma polymerized film 31 are mitigated over time after taken out from the chamber. Accordingly, the second process is preferably performed as soon as possible after the first process. Specifically, preferably, the second process is performed within 60 minutes after completion of the first process, and more preferably the second process is performed within 5 minutes after the first process. When performing the second process within the time frame as above, the surface of the plasma polymerized film 31 maintains a sufficiently activated condition. Thus, there can be obtained a high bonding strength between the first and the second bonded objects 41 and 42 bonded to each other.

In the method for directly bonding solids, such as a conventional silicon-to-silicon direct bonding method, a bonded surface activated can maintain its activated condition only for an extremely short time such as approximately a few to a few ten seconds in the air. Thus, after activation of the bonded surface, it is very difficult to spend time enough to perform procedures such as bonding of the two base plates together.

On the other hand, in the embodiment, the bonded objects are bonded to each other via the plasma polymerized films 31 and 32, so that the activated condition can be maintained for a relatively long time equal to or more than a few minutes, as described above. Therefore, there can be enough time for bonding the objects together, resulting in improvement in bonding efficiency.

In order to further increase the bonding strength, preferably, after the first process, the first bonded object 41 is bonded to the second bonded object 4, while maintaining the reduced atmospheric pressure below an atmospheric pressure. Thereby, the active bonds on the surface of the plasma polymerized film 31 are maintained in a condition where the dangling bonds are exposed. Then, adhering closely the plasma polymerized films 31 and 32 to each other in the condition causes recombination between the dangling bonds on the surfaces of both films 31 and 32. As a result, as described above, the bonded objects 41 and 42 can be particularly strongly bonded together.

The second base member 22 prepared in the second process can be made of any material as in the first base member 21. Preferably, the second base member 22 is made of a same material as that of the first base member 21.

In addition, similarly to the first base member 21, the shape of the second base member 22 is not restricted to a specific one as long as the shape thereof has a surface to which the plasma polymerized film 32 is bonded. For example, the second base member 22 may be plate-shaped (layer-shaped), block-shaped, or bar-shaped.

Preferably, before bonding, a bonded surface 24 of the second base member 22 is subjected to surface treatment in advance to increase adhesion between the bonded surface 24 and the plasma polymerized film 32 in accordance with the material of the second base member 22.

The surface treatment may be the same as that performed on the first base member 21.

Similarly to the first base member 21, for the second base member 22, there are some materials that can sufficiently increase the adhesion strength between the bonded surface 24 and the plasma polymerized film 32 without the surface treatment. Such advantageous materials for the second base member 22 may be the same as those for the first base member 21 described above.

Preferably, the first and the second base members 21 and 22 have approximately a same thermal expansion coefficient. Thereby, there hardly occurs stress due to thermal expansion on the bonded interfaces of the bonded objects 41 and 42 bonded to each other. This can ensure prevention of defects such as separation in the finally obtained bonded structure 1.

Although described later, even when the first and the second base members 21 and 22 have a different thermal expansion coefficient, optimizing conditions for bonding the bonded objects 41 and 42 as below enables the objects to be strongly bonded together with high size precision.

Specifically, preferably, the bonded objects 41 and 42 are bonded to each other at as low a temperature as possible when the thermal expansion coefficients of the base members 21 and 22 are different. Bonding at a low temperature enables thermal stress on the bonded interfaces to be further reduced.

Specifically, the bonded objects 41 is bonded to the bonded object 42 at a temperature ranging preferably approximately from 25 to 50° C. and more preferably approximately from 25 to 40° C., although it depends on a difference between the thermal expansion coefficients of the first and the second base members 21 and 22. Setting the bonding temperature in the range can sufficiently reduce the thermal stress on the bonded interfaces even if the difference between the thermal expansion coefficients of the base members is large to some extent. Thereby, bending or separation of the members in the bonded structure 1 can be surely prevented.

In this case, if the difference between the thermal expansion coefficients of the base members is equal to or larger than $5 \times 10^{-5}$/K, bonding at as low a temperature as possible is particularly recommended, as mentioned above.

Preferably, at least one of the first and the second base members 21 and 22 is made of resin. Since resin has flexibility, using resin as the material of at least one of the base members can lead to mitigation of stress (such as stress due to thermal expansion) on the bonded interfaces of the bonded objects 41 and 42 bonded together. This can suppress destruction of the bonded surfaces, resulting in obtaining the bonded structure 1 having high bonding strength.

In the bonded structure 1 thus obtained, not only based on a physical bonding such as an anchor effect as in adhesives used in conventional bonding methods, but also based on a strong chemical bonding occurring in a short time as a covalent bond, the first and the second base members 21 and 22 are bonded to each other. Thus, in the bonded structure 1, separation between the members and bonding unevenness hardly occur.

In addition, using the plasma polymerizing method, there can be formed a dense film having excellent mechanical properties. Accordingly, the plasma polymerized films 31 and 32 exhibiting high mechanical strength can bond the first and the second base members 21 and 22 to each other strongly and with high airtightness.

The thickness of each of the plasma polymerized films 31 and 32 used to bond the first and the second base members 21 and 22 together can be made thinner than thicknesses of adhesives and can be strictly controlled in an easy manner. Thus, the bonded structure 1 can be obtained with high size precision.

Furthermore, the embodiment does not require thermal treatment at a high temperature (ranging approximately from 700 to 800° C.) as in conventional solid-to-solid bonding methods. Accordingly, base members made of a material having low heat resistance can be bonded together. This can increase material options for the base members.

In the solid-to-solid bonding, no bonding layer is interposed between the members. Thus, when there is a large difference in the thermal expansion coefficient between the first and the second base members 21 and 22, stress due to the difference tends to concentrate on the bonded surfaces, whereby separation can occur between the members. However, in the embodiment, the presence of the plasma polymerized films 31 and 32 serves to mitigate concentration of stress due to the thermal expansion coefficient difference between the base members, thereby preventing the finally obtained bonded structure 1 from causing separation between the members.

In addition, in the embodiment, the base members 21 and 22 are bonded to each other via the plasma polymerized films 31 and 32. Thus, the bonding between the base members can be further strengthened regardless of the materials of the base members.

Furthermore, in the bonding method of the embodiment, in the bonding between the first and the second base members 21 and 22, instead of bonding entire parts of the bonded surfaces to each other, partial regions of the surfaces may be selectively bonded to each other. Specifically, plasma treatment may be performed on a partial region of each of the plasma polymerized films 31 and 32 to simply select each bonded part. Thereby, for example, an area of a bonded region between the first and the second base members 21 and 22 can be controlled, thus facilitating adjustment of the bonding strength in the bonded structure 1. As a result, the bonded structure 1 obtained can be easily disassembled manually, for example.

In that case, controlling the area of the bonded region can mitigate local concentration of stress generated on the bonded region. Thereby, for example, regardless of the large difference in thermal expansion coefficient between the base members 21 and 22, the base members can be surely bonded to each other.

Additionally, in regions other than the bonded region, there is generated a slight gap between the plasma polymerized films 31 and 32. Accordingly, a closed space or a flow channel can be formed in the gap left in the bonded structure 1.

In addition, the first and the second bonded objects 41 and 42 may be arranged such that centers of both objects coincide with each other or deviate from each other.

In the embodiment as above, the bonded structure 1 can be efficiently produced that includes the first and the second bonded objects 41 and 42 bonded to each other at a bonding strength equal to or higher than 5 MPa (50 kgf/cm$^2$). The bonded structure 1 having the above bonding strength can sufficiently prevent separation between the objects under a sever environment. In addition, as will be described below, for example, a liquid droplet discharging head formed using the bonded structure 1 can have excellent durability.

After obtaining the bonded structure 1, according to need, at least one of following two steps 4A and 4B may be performed for the bonded structure 1, thereby further improving the bonding strength in the bonded structure 1.

Figure 3B:
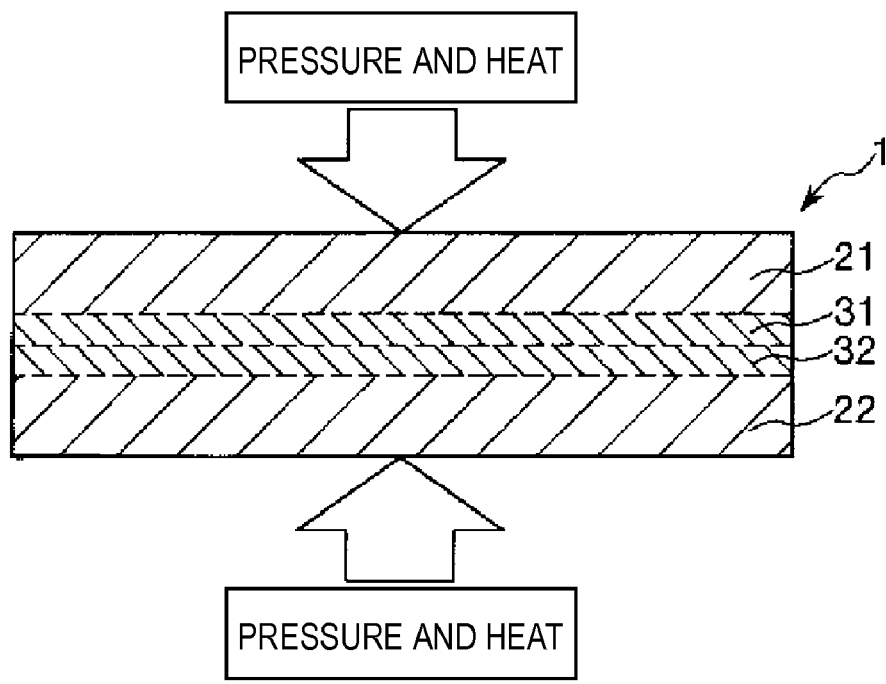

At step 4A, as shown in FIG. 3B, a pressure is applied to the obtained bonded structure 1 in a direction in which the first and the second base members 21 and 22 come close to each other. This allows respective sections of the bonded structure 1 to be closer to each other to promote bonding between active bonds contributing to bonding between the sections, thereby further increasing the bonding strength in the bonded structure 1.

In addition, applying a pressure to the bonded structure 1 allows the gap left on the bonded interfaces in the bonded structure 1 to be squashed down to further extend an area contributing to the bonding. This can further improve the bonding strength in the bonded structure 1.

The pressure applied to the bonded structure 1 is preferably as high as possible at a level that does not damage the bonded structure 1. Thereby, the bonding strength in the bonded structure 1 can be increased in accordance with the pressure.

The pressure may be appropriately adjusted depending on the material and the thickness of each of the base members 21 and 22, conditions for a bonding device, and the like. Specifically, the pressure is preferably approximately 0.2 to 10 MPa and more preferably approximately 1 to 5 MPa. This can surely further increase the bonding strength in the bonded structure 1. The pressure may be over an upper limit value of the range, although there may be damage to each of the base members 21 and 22 depending on the material of the each base member.

Preferably, the pressure is applied for approximately 10 seconds to 30 minutes, although the pressurizing time is not particularly restricted. In addition, the pressurizing time may be appropriately changed in accordance with the pressure applied to the bonded structure 1. Specifically, reducing the pressurizing time as the pressure applied to the bonded structure 1 becomes higher can also improve the bonding strength.

At step 4B, as shown in FIG. 3B, the bonded structure 1 obtained is heated to further increase the bonding strength in the bonded structure 1.

A temperature for heating the bonded structure 1 is not particularly restricted as long as the temperature is higher than room temperature and lower than an upper temperature limit of the bonded structure 1. The heating temperature is preferably approximately 25 to 100° C. and more preferably approximately 50 to 100° C. Heating at a temperature in the range can surely prevent degeneration or deterioration of the bonded structure 1 due to heat, as well as can surely increase the bonding strength.

A heating time is not particularly restricted, but is preferably approximately 1 to 30 minutes.

Additionally, when performing both steps 4A and 4B, those steps are preferably performed at the same time. In other words, as shown in FIG. 3B, preferably, the bonded structure 1 is simultaneously pressurized and heated. This can create synergetic effects between pressurization and heating, thereby further increasing the bonding strength in the bonded structure 1.

Second Embodiment

Next will be described a bonding method according to a second embodiment of the invention.

Figure 5A:
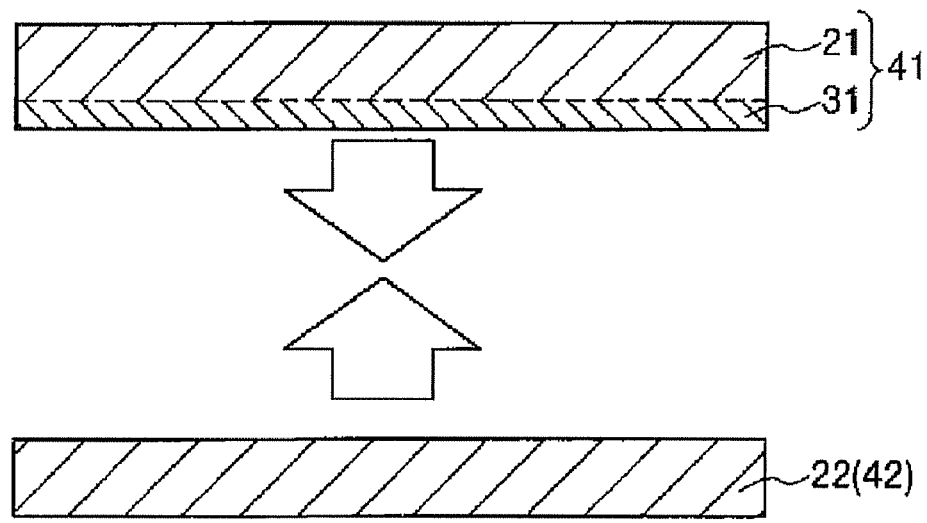
FIGS. 5A and 5B are longitudinal sectional views for illustrating a bonding method according to a second embodiment of the invention.
Figure 5B:
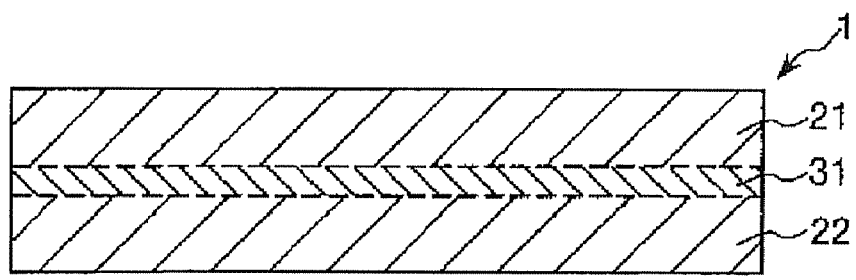

FIGS. 5A and 5B are longitudinal sectional views for illustrating the bonding method of the second embodiment. In a description below, upper and lower sides, respectively, in the drawings, will be referred to as "upper" and "lower", respectively.

In the description of the bonding method of the second embodiment, points different from those in the bonding method of the first embodiment will be focused on and same points as in the first embodiment will be omitted.

The second embodiment is the same as the first embodiment excepting that the plasma polymerized film 32 of the second bonded object 42 is omitted in the second embodiment.

Specifically, in the bonding method of the second embodiment, as shown in FIG. 5A, the second base member 22 is used as the second bonded object 42. Then, as shown in FIG. 5B, the first and the second base members 21 and 22 are bonded together via the plasma polymerized film 31 as a single plasma polymerized layer in the bonded structure 1.

In the method above, it is unnecessary to form the plasma polymerized film 32 on the second base member 22, and thus, the second base member 22 is not exposed to plasma. Accordingly, for example, even when using the second base member 22 having low plasma resistance, the second base member 22 is not degenerated or deteriorated due to plasma. Therefore, in the second embodiment, the material of the second base member 22 can be selected from many material options, without any need for consideration of plasma resistance.

Preferably, in advance, the surface (the bonded surface 24) of the second base member 22 bonded to the first bonded object 41 is subjected to the surface treatment as described above and an intermediate layer is formed on the surface.

In addition, when the bonded surface 24 has any group or substance as below, the first and the second bonded objects 41 and 42 can be strongly bonded together without the surface treatment and formation of the intermediate layer as above.

Examples of such groups and substances include functional groups such as a hydroxyl group, a thiol group, a carboxyl group, an amino group, a nitro group, and an imidazole group, unsaturated bonds such as radicals, ring-opened molecules, double bonds, and triple bonds, halogens such as F, Cl, Br and I, and peroxides. Among them, at least one group or substance may be selected.

Then, by selecting an appropriate surface treatment from those described above to obtain the bonded surface having such a group or substance, the second base member 22 can be obtained to be particularly strongly bonded to the first bonded object 41.

The bonding method of each of the embodiments as described above can be used to bond a different plurality of members to each other.

Examples of such members bonded using the bonding methods of the embodiments include semiconductor elements such as transistors, diodes, and memories, piezoelectric elements such as liquid crystal oscillators, optical elements such as reflecting mirrors, optical lenses, diffraction gratings, and optical filters, photoelectric converting elements such as solar batteries, micro electro mechanical system (MEMS) components such as semiconductor substrates with semiconductor devices mounted thereon, insulating substrates with wirings or electrodes, inkjet recording heads, micro actors, and micro mirrors, sensor components such as pressure sensors and acceleration sensors, package components of semiconductor elements or electronic components, storage media such as magnetic record media, optical magnetic record media, and optical record media, display element components such as liquid crystal display elements, organic EL elements, and electrophoretic display elements, and fuel cell components.

Liquid Droplet Discharging Head

Next will be described an inkjet recording head according to an embodiment of the invention produced by applying the bonded structure of the embodiments.

Figure 6:
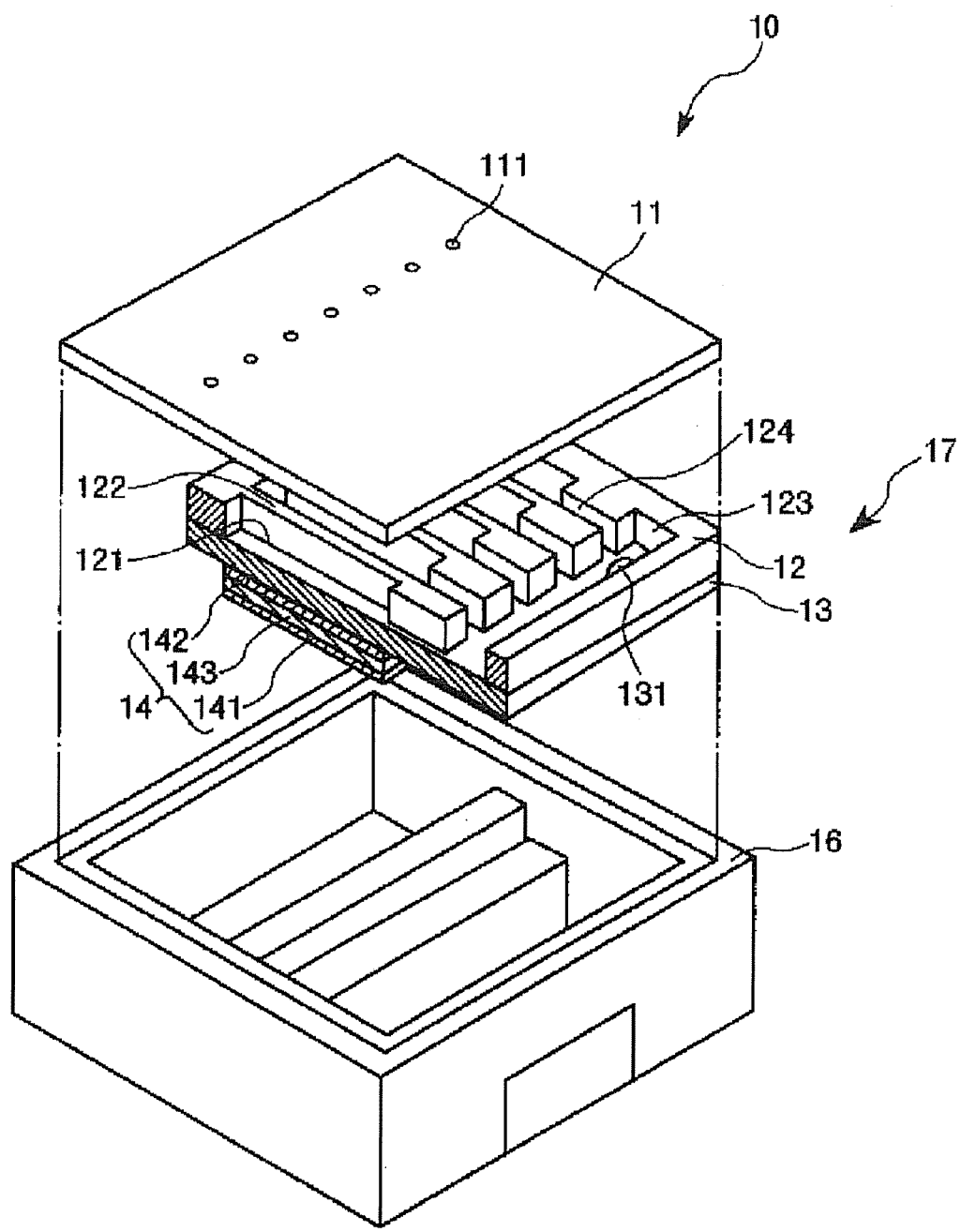
FIG. 6 is an exploded perspective view showing an inkjet recording head (a liquid droplet discharging head) obtained by applying a bonded structure according to an embodiment of the invention.
Figure 7:
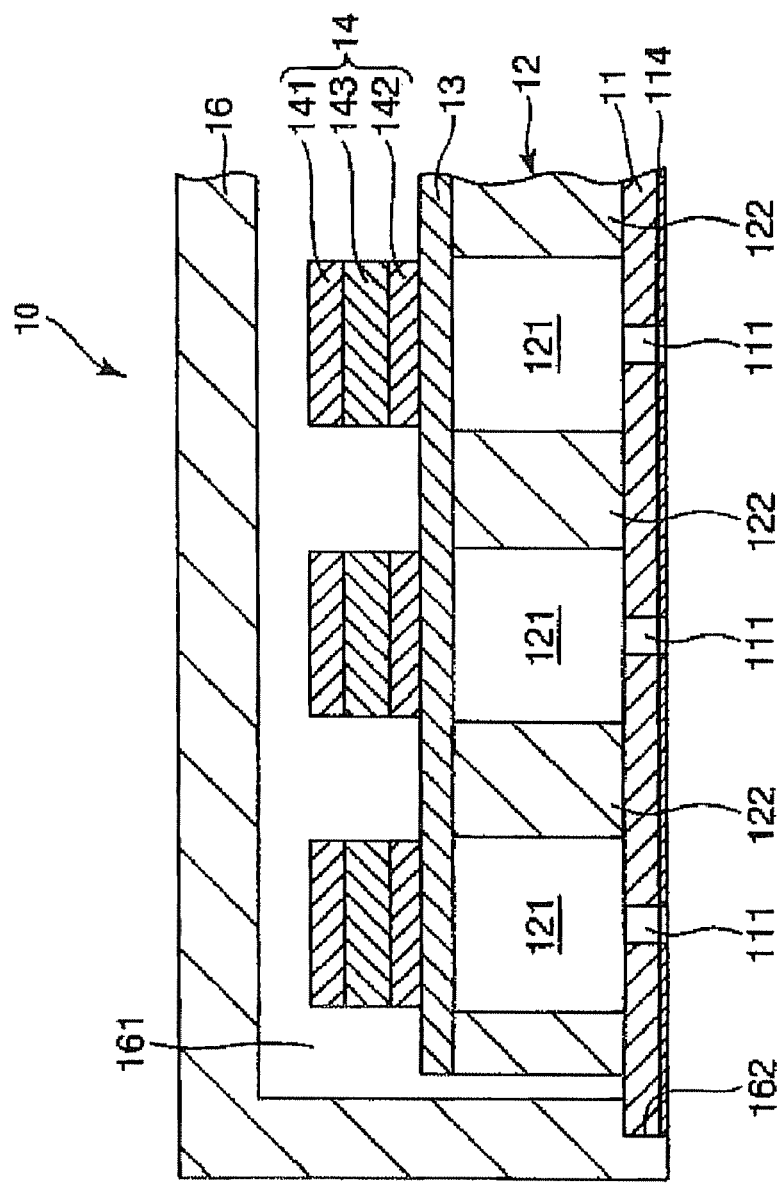
FIG. 7 is a longitudinal sectional view showing a structure of a main part of the inkjet recording head shown in FIG. 6.
Figure 8:
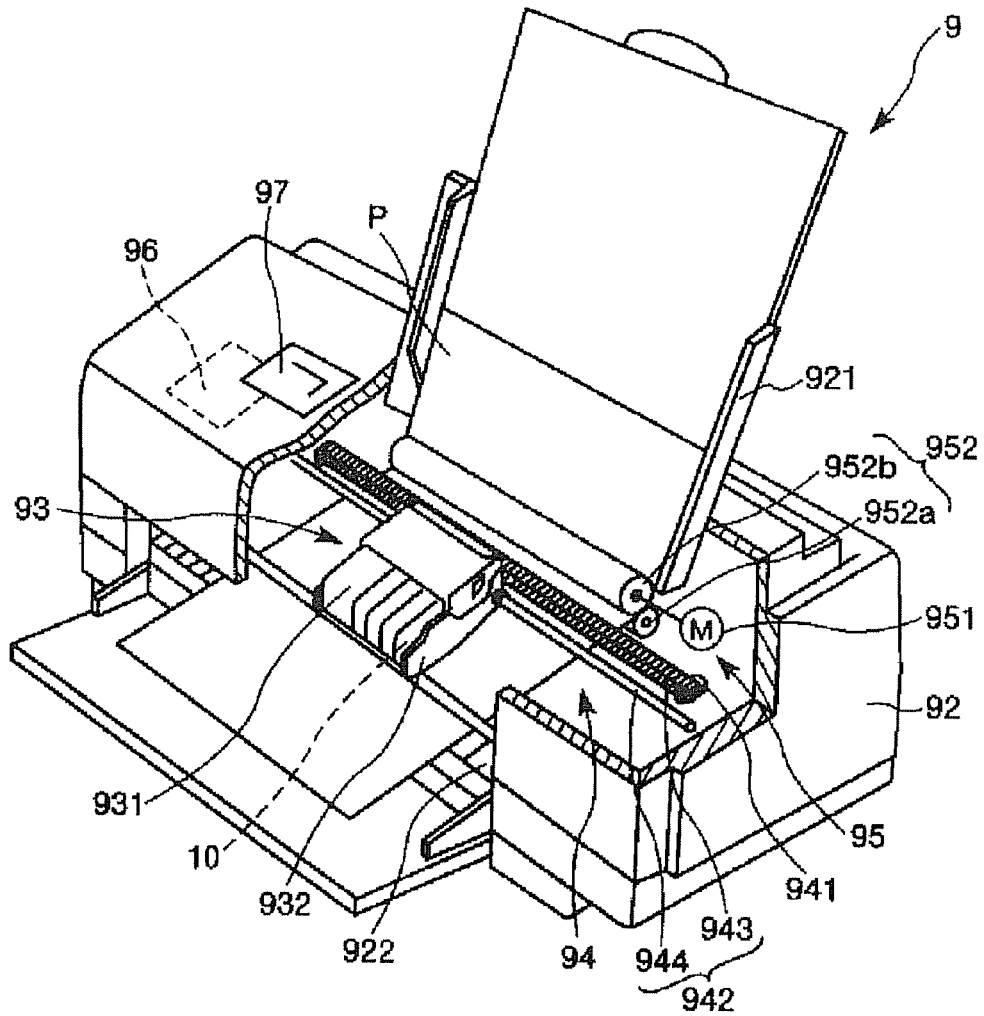
FIG. 8 is a schematic diagram showing an inkjet printer according to an embodiment of the invention including the inkjet recording head shown in FIG. 6.

FIG. 6 is an exploded perspective view showing the inkjet recording head (a liquid droplet discharging head) obtained by applying the bonded structure of the embodiments; FIG. 7 is a sectional view showing a structure of a main part of the inkjet recording head shown in FIG. 6; and FIG. 8 is a schematic view showing an inkjet printer according to an embodiment of the invention, including the inkjet recording head shown in FIG. 6. In FIG. 6, the inkjet recording head is shown upside down relative to its normal operative position.

An inkjet recording head 10 shown in FIG. 6 is mounted in an inkjet printer (a liquid droplet discharging apparatus according to an embodiment of the invention) 9 as shown in FIG. 8.

The inkjet printer 9 shown in FIG. 8 includes a main body 92. At an upper rear part of the main body 92 is provided a tray 921 for placing a record paper P; at a lower front part thereof is provided a paper ejection outlet 922 for ejecting the record paper P; and on a top surface thereof is provided an operation panel 97.

For example, the operation panel 97 is formed by a liquid crystal display, an organic EL display, an LED lamp, or the like, and includes a display section (not shown) displaying an error message and the like and an operating section (not shown) formed by various kinds of switches and the like.

Inside the main body 92 are mainly provided a printing device (a printing unit) 94 with a reciprocating head unit 93, a paper feeding device (a paper feeding unit) 95 feeding each sheet of the record paper P into the printing device 94, and a controlling section (a controlling unit) 96 controlling the printing device 94 and the paper feeding device 95.

The controlling section 96 controls the paper feeding device 95 to intermittently feed each sheet of the record paper P. The record paper P passes through near a lower part of the head unit 93. During the passing of the record paper P, the head unit 93 reciprocates in a direction approximately orthogonal to a direction for feeding the record paper P to perform printing on the record paper P. In short, reciprocation of the head unit 93 and the intermittent feeding of the record paper P, respectively, correspond to main scanning and sub-scanning, respectively, in printing operation so as to perform inkjet printing.

The printing device 94 includes the head unit 93, a carriage motor 941 as a driving source for the head unit 93, and a reciprocation mechanism 942 allowing reciprocation of the head unit 93.

At the lower part of the head unit 93 are provided an inkjet recording head 10 (hereinafter simply referred to as "head 10") with a plurality of nozzle holes 111, an ink cartridge 931 supplying ink to the head 10, and a carriage 932 having the head 10 and the ink cartridge 931 mounted thereon.

The ink cartridge 931 includes four color (yellow, cyan, magenta, and black) ink cartridges to perform full-color printing.

The reciprocation mechanism 942 includes a carriage guiding shaft 943 having end portions supported by a frame (not shown) and a timing belt 944 extended in parallel to the carriage guiding shaft 943.

The carriage 932 is reciprocatably supported by the carriage guiding shaft 943 and fixed to a part of the timing belt 944.

With operation of the carriage motor 941, the timing belt 944 runs forward and backward via pulleys, whereby the head unit 93 is guided by the carriage guiding shaft 943 to perform reciprocating motion. During the reciprocating motion, the head 10 discharges ink according to need to perform printing on the record paper P.

The paper feeding device 95 includes a paper feeding motor 951 and a set of paper feeding rollers 952 rotated by operation of the paper feeding motor 951.

The set of paper feeding rollers 952 includes a driven roller 952a and a driving roller 952b that are opposing each other at upper and lower positions while sandwiching a feed channel of the record paper P. The driving roller 952b is coupled to the paper feeding motor 951. Thereby, the paper feeding rollers 952 are configured so as to feed each of multiple sheets of the record paper P placed in the tray 921 to the printing device 94. Instead of the tray 921, there may be removably provided a paper feeding cassette containing the record paper P.

The controlling section 96 controls the printing device 94, the paper feeding device 95, and the like based on print data input from a personal computer, a host computer of a digital camera or the like.

The controlling section 96 mainly includes a memory storing control programs controlling respective sections and the like, a piezoelectric element driving circuit driving piezoelectric elements 14 (a vibration source) to control timing of discharging of the ink, a driving circuit driving the printing device 94 (the carriage motor 941), a driving circuit driving the paper feeding device 95 (the paper feeding motor 951), a communication circuit acquiring the print data from the host computer, and a CPU electrically connected to those components to perform various kinds of controls at the respective sections, although the components are not shown in the drawing.

In addition, for example, the CPU is electrically connected to various kinds of sensors detecting an amount of ink left in each of the ink cartridges 931, a position of the head unit 93, and the like.

The controlling section 96 acquires the print data to store the data in zthe memory via the communication circuit. The CPU processes the print data to output a driving signal to each driving circuit based on the processed data and input data from the sensors. Outputting the driving signal allows the piezoelectric elements 14, the printing device 94, and the paper feeding device 95 to operate, whereby printing is performed on the record paper P.

Hereinafter, the head 10 will be described in detail with reference to FIGS. 6 and 7.

The head 10 includes a head main body 17 including a nozzle plate 11, an ink cavity substrate 12, a vibrating plate 13, and the piezoelectric elements 14 (the vibration source) bonded to the vibrating plate 13 and a base body 16 storing the head main body 17. The head 10 forms an on-demand piezo jet head.

The nozzle plate may be made of a silicon material such as $SiO_2$, SiN, or quartz glass, a metal material such as Al, Fe, Ni, Cu, or an alloy thereof, an oxide material such as alumina or ion oxide, a carbon material such as carbon black or graphite, or the like.

In the nozzle plate 11 are formed the multiple nozzle holes 111 for discharging droplets of the ink. Pitches between the nozzle holes 111 are appropriately determined in accordance with printing precision.

The ink cavity substrate 12 is bonded (fixed) to the nozzle plate 11.

The ink cavity substrate 12 includes a plurality of ink cavities (namely, pressure cavities) 121, a reservoir 123 storing ink supplied from each ink cartridge 931, and a supply hole 124 supplying the ink to each ink cavity 121. The ink cavities 121, the reservoir 123, and the supply holes 124 are partitioned by the nozzle plate 11, side walls (partition walls) 122, and the vibrating plate 13 described below.

Each ink cavity 121 is formed in a strip shape (a rectangular shape) and arranged corresponding to each nozzle hole 111. A capacity of the each ink cavity 121 can be changed by vibration of the vibrating plate 13 described below. The ink cavity 121 is configured such that ink is discharged by changing of the capacity.

For example, a base material for the ink cavity substrate 12 is a silicon monocrystalline substrate, a glass substrate, a resin substrate, or the like. Those substrates are all for general purpose use. Accordingly, using any one of the substrates can reduce production cost of the head 10.

The vibrating plate 13 is bonded to a side of the ink cavity substrate 12 not facing the nozzle plate 11, and the piezoelectric elements 14 are provided on a side of the vibrating plate 13 not facing the ink cavity substrate 12.

At a predetermined position of the vibrating plate 13 is formed a through-hole 131 penetrating through in a thickness direction of the vibrating plate 13. Ink can be supplied to the reservoir 123 from each ink cartridge 931 via the through-hole 131.

Each of the piezoelectric elements 14 is formed by interposing a piezoelectric layer 143 between a lower electrode 142 and an upper electrode 141 and arranged corresponding to an approximately center part of each ink cavity 121. The each piezoelectric element 14 is electrically connected to the piezoelectric-element driving circuit to operate (vibrate and deform) in response to a signal from the piezoelectric-element driving circuit.

The piezoelectric element 14 serves as each vibration source. Vibration of the piezoelectric elements 14 allows the vibrating plate 13 to vibrate so as to momentarily increase an internal pressure in the ink cavities 121.

The base body 16 may be made of any one of resin materials metal materials, and the like. The nozzle plate 11 is fixed to the base body 16 to be supported by the base body 16. Specifically, An edge region of the nozzle plate 11 is supported by a stepped portion 162 formed at an outer periphery of a recessed portion 161 of the base body 16 in a condition where the recessed portion 161 stores the head main body 17.

Among bonding between the nozzle plate 11 and the ink cavity substrate 12, bonding between the ink cavity substrate 12 and the vibrating plate 13, and bonding between the nozzle plate 11 and the base body 16, at least one bonding is performed using the bonding method according to any of the embodiments.

In the head 10 thus configured, the bonded interfaces of bonded regions have high bonding strength and high chemical resistance, thereby improving durability and liquid tightness against ink stored in each ink cavity 121. Consequently, the head 10 becomes highly reliable.

In addition, since a highly reliable bonding can be provided at a very low temperature, there is an advantage that a large-area head can be obtained using materials having a different linear expansion coefficient.

In the head 10 thus configured, the each piezoelectric layer 143 is not deformed in a condition where a predetermined discharging signal is not input via the piezoelectric-element driving circuit, namely in a condition where no voltage is applied between the lower and the upper electrodes 142 and 141. Accordingly, the vibrating plate 13 is also not deformed, thus causing no change in the capacity of the ink cavity 121. As a result, no ink droplet is discharged from the nozzle hole 111.

Meanwhile, the piezoelectric layer 143 is deformed when a predetermined signal is input via the piezoelectric-element driving circuit, namely when a predetermined voltage is applied between the electrodes 142 and 141 of the piezoelectric element 14. Thereby, the vibration plate 13 is largely bent, and thus, the capacity of the ink cavity 121 changes. Then, pressure inside the ink cavity 121 momentarily increases, resulting in discharging of an ink droplet form the nozzle hole 111.

After discharging ink one time, the piezoelectric-element driving circuit stops application of a voltage between the lower and the upper electrodes 142 and 141. Thereby, the piezoelectric element 14 returns to an approximately original shape and the capacity of the ink cavity 121 increases. In this situation, ink is under pressure directing toward the nozzle hole 111 from the ink cartridge 931 (pressure in a forward direction). This prevents air from entering from the nozzle hole 111 into the ink cavity 121, so that ink having an amount corresponding to an amount of ink to be discharged is supplied to the ink cavity 121 from the ink cartridge 931 (the reservoir 123).

In this manner, in the head 10, a discharging signal is sequentially input to the piezoelectric element 14 at a position necessary for printing via the piezoelectric-element driving circuit, thereby enabling arbitrary (desired) characters, figures, and the like to be printed.

Additionally, the head 10 may include an electrothermal converting element instead of the piezoelectric element 14. That is, the head 10 may be of the bubble jet ("bubble jet" is a registered trademark) system using thermal expansion of a material by the electrothermal converting element.

In the head 10 structured as above, on the nozzle plate 11 is formed a coating film 114 exhibiting lyophobic properties. This can surely prevent a droplet of ink from being left around the nozzle hole 111 when the droplet is discharged from the nozzle hole 111. As a result, the ink droplet from the nozzle hole 111 can be surely landed on an intended region.

Hereinabove, the embodiments of the invention have been described based on the drawings, but the invention is not restricted to the embodiments above.

For example, the bonding method according to an embodiment of the invention may be an arbitrary one or a combination of arbitrary two or more methods among the bonding methods according to the embodiments described above.

The bonding method of the embodiments may further include at least one step for an arbitrary purpose when needed.

Furthermore, the bonding method of the each embodiment uses the two base members, but may use three or more base members to bond the members together.

EXAMPLES

Next will be described specific examples of the embodiments.

1. Production of Bonded Structure

Example 1

First, as a first base member and a second base member, respectively, there were prepared a monocrystalline silicon substrate and a glass substrate, respectively, each having a length of 20 mm, a width of 20 mm, and an average thickness of 1 mm.

Next, the monocrystalline silicon substrate and the glass substrate each were stored in the chamber 101 of the plasma polymerization apparatus 100 shown in FIG. 1 to perform surface treatment using oxygen plasma.

Then, a plasma polymerized film having an average thickness of 200 nm was formed on a surface of each substrate subjected to the surface treatment. Conditions for film-formation were as follows:

Film-Formation Conditions

First Gas (The first gas was slowly substituted by the second gas during a film-formation process.)
Composition of raw gas: octamethyltrisiloxane
Flow rate of raw gas: 50 sccm
Composition of carrier gas: argon
Flow rate of carrier gas: 100 sccm
Pressure upon introduction of first gas: 1 Pa
Second Gas
Composition: nitrogen
Flow rate: 100 sccm
Pressure upon introduction of second gas: 1 Pa
Output of high frequency electric power: 100 W→50 W (the output is changed in synchronization with gas substitution)
Treatment time: 15 minutes (during the time, a second-gas introduction time is 30 seconds.)
Substrate temperature: 20° C.

The plasma polymerized thus formed was formed by a polymerized product of octamethyltrisiloxane (raw gas) and included a siloxane bond structure having a silicon skeleton with a random atomic structure and an alkyl group (a leaving group).

Thereby, a first bonded object was obtained by forming the plasma polymerized film on the monocrystalline silicon substrate, and a second bonded object was obtained by forming the plasma polymerized film on the glass substrate.

Next, the first and the second bonded objects obtained were taken out from the chamber. After one minutes, the bonded objects were pressed against each other to be bonded together, whereby a bonded structure was obtained.

Next, the obtained bonded structure was heated at 80° C. under a pressure of 3 MPa for 15 minutes to improve bonding strength in the bonded structure.

Example 2

A bonded structure was obtained in the same manner as in Example 1 excepting that the heating temperature was changed from 80° C. to 25° C.

Examples 3 to 12

Each bonded structure was obtained in the same manner as in Example 1 excepting that the materials of the first and the second base members were changed to those shown in Table 1.

Example 13

A bonded structure was obtained in the same manner as in Example 1 excepting that the carrier gas included in the first gas was changed to nitrogen gas.

Example 14

A bonded structure was obtained in the same manner as in Example 1 excepting that the second gas was changed to argon gas.

Example 15

A bonded structure was obtained in the same manner as in Example 1 excepting that after producing the first and the second bonded objects, both bonded objects were pressed against each other to be bonded together, while maintaining an inside pressure of the chamber at 1 Pa.

Example 16

A bonded structure was obtained in the same manner as in Example 1 excepting that upon substitution of the first gas by the second gas, the second gas was supplied to be plasmatized after once stopping supply of the first gas and application of the high frequency electric power to eliminate plasma of the first gas.

Example 17

A bonded structure was obtained in the same manner as in Example 1 excepting that formation of the plasma polymerized film on the second base member was omitted and the second base member was directly used as the second bonded object.

Comparative Example 1

A bonded structure was obtained in the same manner as in Example 1 excepting that using a siloxane bond-containing liquid material, a coating film made of a silicon compound was formed on each of the monocrystalline silicon substrate (the first base member) and the glass substrate (the second base member) and the base members were pressed against each other to be bonded together so as to allow the coating films to be closely contacted to each other. In this case formation of the coating films was performed as below.

First, the first and the second base members were exposed to a gas generated by vaporizing hexamethyldisilane (HMDS) to form a coating film made of hexamethyldisilane on each of the substrates.

Next, UV light was applied to the coating films. Thereafter, the base members were pressed against each other to be bonded together such that surfaces of the coating films subjected to the UV light were closely contacted to each other.

Comparative Example 2

A bonded structure was obtained in the same manner as in Comparative Example 1 excepting that the second base member was a PET substrate.

Comparative Examples 3 to 6

Each bonded structure was obtained in the same manner as in Comparative Example 1 excepting that the materials of the first and the second base members were those shown in Table 1 and both base members were bonded to each other by an epoxy adhesive.

2. Evaluation of Bonded Structures 2-1. Evaluation of Bonding Strength (Splitting Strength)

Bonding strength was measured in each of the bonded structures obtained in Examples and Comparative Examples.

Bonding strength measurements were performed by measuring strength immediately before separating the base members from each other. Then, bonding strengths measured were evaluated based on criteria below.

The bonding strength measurements were performed immediately after formation of the bonded structure and after temperature cycle tests for the bonded structures performed 100 times in a temperature range from −40° C. to 125° C.

Evaluation Criteria of Bonding Strength

Excellent: 10 MPa (100 kgf/cm$^2$) or higher

Good: 5 MPa (50 kgf/cm$^2$) or higher and lower than 10 MPa (100 kgf/cm$^2$)

Fair: 1 MPa (10 kgf/cm$^2$) or higher and lower than 5 MPa (50 kgf/cm$^2$)

Poor: lower than 1 MPa (10 kgf/cm$^2$)

2-2. Evaluation of Size Precision

A size precision in a thickness direction was measured in each of the bonded structures obtained in Examples and Comparative Examples.

Each size precision measurement was performed by measuring a thickness of each corner of the bonded structure having a square shape to calculate a difference between a maximum value and a minimum value in the thicknesses of the four corners. Then, the difference values calculated were evaluated based on criteria below.

Evaluation Criteria of Size Precision

Good: lower than 10 μm

Poor: 10 μm or higher 2-3. Evaluation of Chemical Resistance

The bonded structure obtained in each of Examples and Comparative Examples was immersed in inkjet printer ink (HQ4 produced by Seiko Epson Co., Ltd.) maintained at 80° C. for 3 weeks and 100 days, respectively. Thereafter, the base members were separated from each other to check a presence of the ink on the bonded interfaces. Then, results were evaluated based on criteria below.

Evaluation Criteria of Chemical Resistance

Excellent: ink was not found.

Good: ink was found slightly in the corners.

Fair: ink was found along the corners.

Poor: ink was found between the bonded interfaces.

Table 1 shows results obtained in the evaluations of 2-1 to 2-3.

TABLE 1

| | | | Conditions for producing bonded structure | | | | | |
|---|---|---|---|---|---|---|---|---|
| | | | Conditions for producing bonding film | | | | | |
| | Material of first base member | Bonding form | Composition | Plasma generating gas | | Plasma upon substitution of gas | Location of bonding film | Material of second base member |
| | | | | First gas | Second gas | | | |
| Ex 1 | Silicon | Plasma polymerized film | Polymerized product of Octamethyl-trisiloxane | Raw gas + Ar | N₂ | Maintained | Both base members | Glass |
| Ex 2 | Silicon | | | | | | | Glass |
| Ex 3 | Silicon | | | | | | | Silicon |
| Ex 4 | Silicon | | | | | | | Stainless steel |
| Ex 5 | Silicon | | | | | | | Aluminum |
| Ex 6 | Silicon | | | | | | | PET |
| Ex 7 | Silicon | | | | | | | PI |
| Ex 8 | Glass | | | | | | | Glass |
| Ex 9 | Glass | | | | | | | Stainless steel |
| Ex 10 | Stainless steel | | | | | | | PET |
| Ex 11 | Stainless steel | | | | | | | PI |
| Ex 12 | Stainless steel | | | | | | | Aluminum |
| Ex 13 | Silicon | | | Raw gas + N₂ | N₂ | | | Glass |
| Ex 14 | Silicon | | | Raw gas | Ar | | | Glass |
| Ex 15 | Silicon | | | Raw gas + Ar | N₂ | | | Glass |
| Ex 16 | Silicon | | | | | Once eliminated | | Glass |
| Ex 17 | Silicon | | | | | Maintained | Only one base member | Glass |
| Cp 1 | Silicon | Gas-phase film formation | Polyorgano-siloxane | — | — | — | Both base members | Glass |
| Cp 2 | Silicon | | | | | | | PET |
| Cp 3 | Silicon | Adhesive | Epoxy | | | | — | Glass |
| Cp 4 | Silicon | | | | | | | Silicon |
| Cp 5 | Silicon | | | | | | | Stainless steel |
| Cp 6 | Silicon | | | | | | | PET |

| | Conditions for producing bonded structure | | Evaluation results | | | | |
|---|---|---|---|---|---|---|---|
| | | | Bonding strength | | | Chemical resistance | |
| | Atmosphere in bonding | Heating temperature | Immediately after bonding | After temperature cycle | size precision | 3 weeks later | 100 days later |
| Ex 1 | Air | 80° C. | Good | Good | Good | Excellent | Excellent |
| Ex 2 | | 25° C. | Good | Good | Good | Excellent | Excellent |
| Ex 3 | | 80° C. | Good | Good | Good | Excellent | Excellent |
| Ex 4 | | 80° C. | Good | Good | Good | Excellent | Excellent |
| Ex 5 | | 80° C. | Good | Good | Good | Excellent | Excellent |
| Ex 6 | | 80° C. | Excellent | Excellent | Good | Excellent | |
| Ex 7 | | 80° C. | Excellent | Excellent | Good | | |
| Ex 8 | | 80° C. | Good | Good | Good | | Excellent |
| Ex 9 | | 80° C. | Good | Good | Good | Excellent | Excellent |
| Ex 10 | | 80° C. | Excellent | Excellent | Good | Excellent | Good |
| Ex 11 | | 80° C. | Excellent | Excellent | Good | Excellent | Good |
| Ex 12 | | 80° C. | Good | Good | Good | Excellent | Excellent |
| Ex 13 | | 80° C. | Good | Fair | Good | Excellent | Excellent |
| Ex 14 | | 80° C. | Good | Fair | Good | Good | Good |
| Ex 15 | Reduced pressure | 80° C. | Excellent | Excellent | Good | Excellent | Excellent |
| Ex 16 | Air | 80° C. | Good | Fair | Good | Good | Fair |
| Ex 17 | | 80° C. | Good | Fair | Good | Excellent | Fair |
| Cp 1 | Air | 80° C. | Good | Fair | Good | Fair | Poor |
| Cp 2 | | 80° C. | Good | Poor | Good | Poor | Poor |
| Cp 3 | | — | Excellent | Poor | Poor | Fair | Poor |
| Cp 4 | | | Excellent | Poor | Poor | Fair | Poor |

TABLE 1-continued

| | | | | | |
|---|---|---|---|---|---|
| Cp 5 | Excellent | Poor | Poor | Fair | Poor |
| Cp 6 | Excellent | Poor | Poor | Fair | Poor |

Notes:
Ex and Cp, respectively, represent Example and Comparative Example, respectively.
PET and PI, respectively, represent polyethylene terephthalate and polyimide, respectively.

As obvious in Table 1, the bonded structures obtained in all Examples exhibited excellent characteristics in each category of the bonding strength, the size precision, and the chemical resistance.

Particularly, when the base members were made of resin, improved bonding strength was found.

In addition, bonding between the plasma polymerized films exhibited higher bonding strength and chemical resistance than bonding between the plasma polymerized film on one of the base members and the other base member, Furthermore, bonding without exposure to the air after plasma-polymerized film formation was found to improve the bonding strength and the chemical resistance.

Meanwhile, bonding via a bonding film made of silazane (Comparative Examples 1 and 2) showed insufficient bonding strength and chemical resistance.

Additionally, in bonding using an adhesive (Comparative Examples 3 to 6), the size precision and long-term durability were found to be insufficient.

What is claimed is:

1. A bonding method, comprising:
   a first process that includes plasmatizing a first gas including a raw gas containing a siloxane (Si—O) bond at a reduced-pressure atmosphere, substituting the first gas by a second gas mainly including an inert gas, and plasmatizing the second gas to form a first plasma polymerized film on at least a part of a base member so as to obtain a first bonded object including the base member and the plasma polymerized film; and
   a second process that includes preparing a second bonded object that is to be bonded to the first bonded object and pressing the first and the second bonded objects against each other such that a surface of the first plasma polymerized film is closely contacted to a surface of the second bonded object to bond the objects together.

2. The bonding method according to claim 1, wherein the second bonded object includes a second base member and a second plasma polymerized film that is same as the first plasma-polymerized film and formed on the second base member, and, in the second process, the first and the second bonded objects are pressed against each other such that the first and the second plasma polymerized films are closely contacted to each other.

3. The bonding method according to claim 1, wherein the inert gas included in the second gas is nitrogen gas.

4. The bonding method according to claim 1, wherein the first gas further includes an inert gas that is same as the inert gas included in the second gas.

5. The bonding method according to claim 1, wherein the first gas further includes an inert gas that is different from the inert gas included in the second gas.

6. The bonding method according to claim 1, wherein, when the first gas is substituted by the second gas, the first gas is slowly substituted by the second gas while maintaining the first gas in the plasmatized condition.

7. The bonding method according to claim 1, wherein the plasmatization is performed using an action of high frequency electric power, and high frequency electric power for plasmatizing the second gas is smaller than high frequency electric power for plasmatizing the first gas.

8. The bonding method according to claim 7, wherein the high frequency electric power for plasmatizing the second gas is 0.3 to 0.7 times as the high frequency electric power for plasmatizing the first gas.

9. The bonding method according to claim 1, wherein a pressure of the reduced-pressure atmosphere in the first process ranges from 0.01 to 100 Pa.

10. The bonding method according to claim 1, wherein, after the first process, the second process is performed while maintaining the pressure of the reduced-pressure atmosphere below an atmospheric pressure.

11. The bonding method according to claim 1, wherein the first and the second gases are plasmatized in a same chamber.

12. The bonding method according to claim 1, wherein the raw gas is mainly made of octamethyltrisiloxane.

13. The bonding method according to claim 1, wherein the plasma polymerized film has an average thickness ranging from 10 to 10,000 nm.

* * * * *